(12) United States Patent
Xie et al.

(10) Patent No.: US 12,127,300 B2
(45) Date of Patent: Oct. 22, 2024

(54) EXTENDED SIGNALING FOR MULTI-SUBSCRIBER IDENTITY MODULE (MSIM) USER-EQUIPMENT (UE) FOR NEW RADIO (NR)

(71) Applicant: QUALCOMM Incorporated, San Diego, CA (US)

(72) Inventors: Ling Xie, Beijing (CN); Reza Shahidi, San Diego, CA (US); Jiming Guo, Beijing (CN); Qingxin Chen, San Diego, CA (US); Aziz Gholmieh, Del Mar, CA (US); Leena Zacharias, San Jose, CA (US); Jun Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 17/593,616

(22) PCT Filed: Mar. 22, 2019

(86) PCT No.: PCT/CN2019/079273
§ 371 (c)(1),
(2) Date: Sep. 21, 2021

(87) PCT Pub. No.: WO2020/191524
PCT Pub. Date: Oct. 1, 2020

(65) Prior Publication Data
US 2022/0256328 A1    Aug. 11, 2022

(51) Int. Cl.
*H04W 4/00* (2018.01)
*H04W 8/18* (2009.01)
(Continued)

(52) U.S. Cl.
CPC ............ *H04W 8/183* (2013.01); *H04W 8/24* (2013.01); *H04W 72/044* (2013.01);
(Continued)

(58) Field of Classification Search
CPC ..... H04W 8/183; H04W 8/24; H04W 72/044; H04W 76/30; H04W 72/042; H04W 76/28
(Continued)

(56) References Cited

U.S. PATENT DOCUMENTS 8,320,276 B1 * 11/2012 Callender ........... H04L 25/0204
455/437
8,909,229 B2 * 12/2014 Martin ............ H04W 36/00835
370/335
(Continued)

FOREIGN PATENT DOCUMENTS

| CN | 103636273 A | 3/2014 |
|---|---|---|
| CN | 106256142 A | 12/2016 |

(Continued)

OTHER PUBLICATIONS

International Search Report and Written Opinion—PCT/CN2019/079273—ISA/EP—Dec. 30, 2019.
(Continued)

*Primary Examiner* — Marceau Milord
(74) *Attorney, Agent, or Firm* — Patterson+ Sheridan, L.L.P.

(57) ABSTRACT

Certain aspects of the present disclosure are generally directed to extended signaling protocols for multi-subscriber identity module (MSIM) user-equipment (UE) for new radio (NR). For example, certain aspects provide a method for wireless communication by a UE. The method generally includes receiving a first message from a network entity enquiring regarding information associated with a multi-
(Continued)

subscriber identify module (SIM) capability of the UE, determining the information associated with the multi-SIM capability of the UE in response to the inquiry from the network entity, and communicating one or more messages to indicate the information regarding the multi-SIM capability to the network entity.

27 Claims, 32 Drawing Sheets

(51) Int. Cl.
    *H04W 8/24*     (2009.01)
    *H04W 72/044*     (2023.01)
    *H04W 72/23*     (2023.01)
    *H04W 76/28*     (2018.01)
    *H04W 76/30*     (2018.01)

(52) U.S. Cl.
    CPC ........... *H04W 72/23* (2023.01); *H04W 76/28* (2018.02); *H04W 76/30* (2018.02)

(58) Field of Classification Search
    USPC ........................................................ 370/329
    See application file for complete search history.

(56) References Cited

U.S. PATENT DOCUMENTS

| | | | |
|---|---|---|---|
| 9,894,547 B2 | 2/2018 | Das et al. | |
| 10,021,558 B2 | 7/2018 | Lalwaney et al. | |
| 10,292,201 B2* | 5/2019 | Liu | H04W 76/28 |
| 10,568,073 B2* | 2/2020 | Pathak | H04W 76/27 |
| 11,375,470 B2 | 6/2022 | Zhu et al. | |
| 11,856,601 B2* | 12/2023 | Shimomura | H04W 74/0808 |
| 11,895,729 B2* | 2/2024 | Xu | H04W 76/28 |
| 2013/0237257 A1 | 9/2013 | Walke et al. | |
| 2015/0163827 A1* | 6/2015 | Ekici | H04W 68/02 370/338 |
| 2015/0237597 A1 | 8/2015 | Kanamarlapudi et al. | |
| 2015/0289314 A1* | 10/2015 | Yang | H04W 88/06 455/552.1 |
| 2016/0219648 A1 | 7/2016 | Awoniyi-Oteri et al. | |
| 2016/0262200 A1* | 9/2016 | Su | H04W 52/0209 |
| 2016/0295439 A1* | 10/2016 | Yang | H04W 24/10 |
| 2016/0366645 A1* | 12/2016 | Song | H04W 52/0229 |
| 2018/0020503 A1 | 1/2018 | Deenoo et al. | |
| 2018/0160422 A1* | 6/2018 | Pathak | H04W 76/10 |
| 2018/0338253 A1 | 11/2018 | Nagaraja et al. | |
| 2019/0053130 A1* | 2/2019 | Guo | H04L 1/0026 |
| 2019/0082446 A1 | 3/2019 | Guo et al. | |
| 2019/0174449 A1* | 6/2019 | Shan | H04W 60/04 |
| 2021/0368578 A1* | 11/2021 | Xu | H04W 52/0216 |
| 2021/0400761 A1* | 12/2021 | Maleki | H04W 76/28 |
| 2022/0039008 A1* | 2/2022 | Nimbalker | H04W 52/02 |
| 2022/0039012 A1* | 2/2022 | Kwon | H04W 68/005 |
| 2022/0182951 A1* | 6/2022 | Zhou | H04W 24/10 |

FOREIGN PATENT DOCUMENTS

| | | |
|---|---|---|
| WO | 2013001149 A1 | 1/2013 |
| WO | 2015168029 | 11/2015 |
| WO | 2016118248 | 7/2016 |
| WO | 2017128287 A1 | 8/2017 |
| WO | 2017172604 | 10/2017 |
| WO | 2018085145 A1 | 5/2018 |
| WO | 2018141081 A1 | 8/2018 |
| WO | 2018141148 A1 | 8/2018 |
| WO | 2018213287 | 11/2018 |
| WO | 2019033017 A1 | 2/2019 |

OTHER PUBLICATIONS

Supplementary European Search Report—EP19921955—Search Authority—Berlin—Sep. 28, 2022.

* cited by examiner

1002

1004

1700

2500

| MAC CE Type |
|---|
| DL CSI |
| UL CSI |

EXTENDED SIGNALING FOR MULTI-SUBSCRIBER IDENTITY MODULE (MSIM) USER-EQUIPMENT (UE) FOR NEW RADIO (NR)

CROSS-REFERENCE TO RELATED APPLICATIONS

This application is a national stage application under 35 U.S.C. 371 of PCT/CN2019/079273, filed Mar. 22, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for communicating with a multi-subscriber identity module (SIM) deployment configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (IRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology, Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user-equipment (UE). The method generally includes receiving a first message from a network entity enquiring regarding information associated with a multi-subscriber identify module (SIM) capability of the UE, determining the information associated with the multi-SIM capability of the UE in response to the inquiry from the network entity, and communicating one or more messages to indicate the information regarding the multi-SIM capability to the network entity.

Certain aspects provide a method for wireless communication by a user-equipment (UR). The method generally includes generating at least one control element (CE) having information indicating at least one tune-away period of a radio-access technology (RAT) associated with a multi-subscriber identify module (SIM) capability of the LTE, and transmitting the at least one CE indicating the at least one tune-away period to a network entity.

Certain aspects provide a method for wireless communication by a network entity. The method generally includes generating a first message enquiring regarding information associated with a multi-subscriber identify module (SIM) capability of a user-equipment (UE), transmitting the first message to the UE, and communicating one or more messages to obtain the information regarding the multi-SIM capability.

Certain aspects provide a method for wireless communication by a network entity. The method generally includes receiving at least one control element (CE) having information indicating at least one tune-away period of a radio-access technology (RAT) associated with a multi-subscriber identify module (SIM) capability of the UE, and communicating with the UE in accordance with the indication of the at least one tune-away period.

Certain aspects provide a method for wireless communication. The method generally includes generating a first message indicating a preferred discontinuous reception (DRX) cycle of a user-equipment (UE) for reception via a radio-access technology (RAT) associated with a subscriber identify module (SIM) of the UE associated with a multi-SIM deployment of the UE, transmitting the first message to a network entity, and receiving a second message indicating another DRX cycle to be applied for reception via the RAT after transmitting the first message.

Certain aspects provide a method for wireless communication. The method generally includes generating a radio resource control (RRC) request, the RRC request comprising an indication of whether the RRC request is requesting an RRC release or an RRC suspension with respect to a subscriber identify module (SIM) of a multi-SIM deployment of the UE, transmitting the RRC request to a network entity, and receiving an RRC message from the network entity confirming the RRC request.

Certain aspects provide a method for wireless communication. The method generally includes negotiating a pre-scheduled resource allocation with a network entity prior to a start of periodic tune-away periods, generating a message indicating an update to a periodic tune-away gap configuration associated with the periodic tune-away periods, and transmitting the message via the prescheduled resource allocation.

Certain aspects provide a method for wireless communication. The method generally includes detecting that a bandwidth part (BWP) setting at a user-equipment SUE) is out of sync with a network entity, generating a control element (CE) indicating that the BWP setting is out of sync, transmitting the CE to the network entity, and receiving downlink control information (DCI) indicating a new BWP to use for communication with the network entity.

Certain aspects provide a method for wireless communication. The method generally includes receiving a first message indicating a preferred discontinuous reception (DRX) cycle of a user-equipment (UE) for reception via a radio-access technology (RAT) associated with a subscriber identify module (SIM) of the UE associated with a multi-SIM deployment of the UE, generating a second message indicating another DRX cycle to be applied for the reception via the RAT after receiving the first message, and transmitting the second message.

Certain aspects provide a method for wireless communication. The method generally includes receiving a radio resource control (RRC) request from a user-equipment (UE), the RRC request comprising an indication of whether the RRC request is requesting an RRC release or an RRC suspension with respect to a subscriber identify module (SIM) of a multi-SIM deployment of the UE, generating an RRC message confirming the RRC request, and transmitting the RRC message to the UE.

Certain aspects provide a method for wireless communication. The method generally includes negotiating a pre-scheduled resource allocation with a user-equipment (UE) prior to a start of periodic tune-away periods, and receiving a message indicating an update to a periodic tune-away gap configuration associated with the periodic tune-away periods.

Certain aspects provide a method for wireless communication. The method generally includes receiving a control element (CE) indicating that a bandwidth part (BWP) setting at a user-equipment (UE) is out of sync with the network entity, generating downlink control information (DCI) indicating a new BWP to use for communication with the network entity, and transmitting the DCI to the UE.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 25 illustrates a control element for link efficiency recovery, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
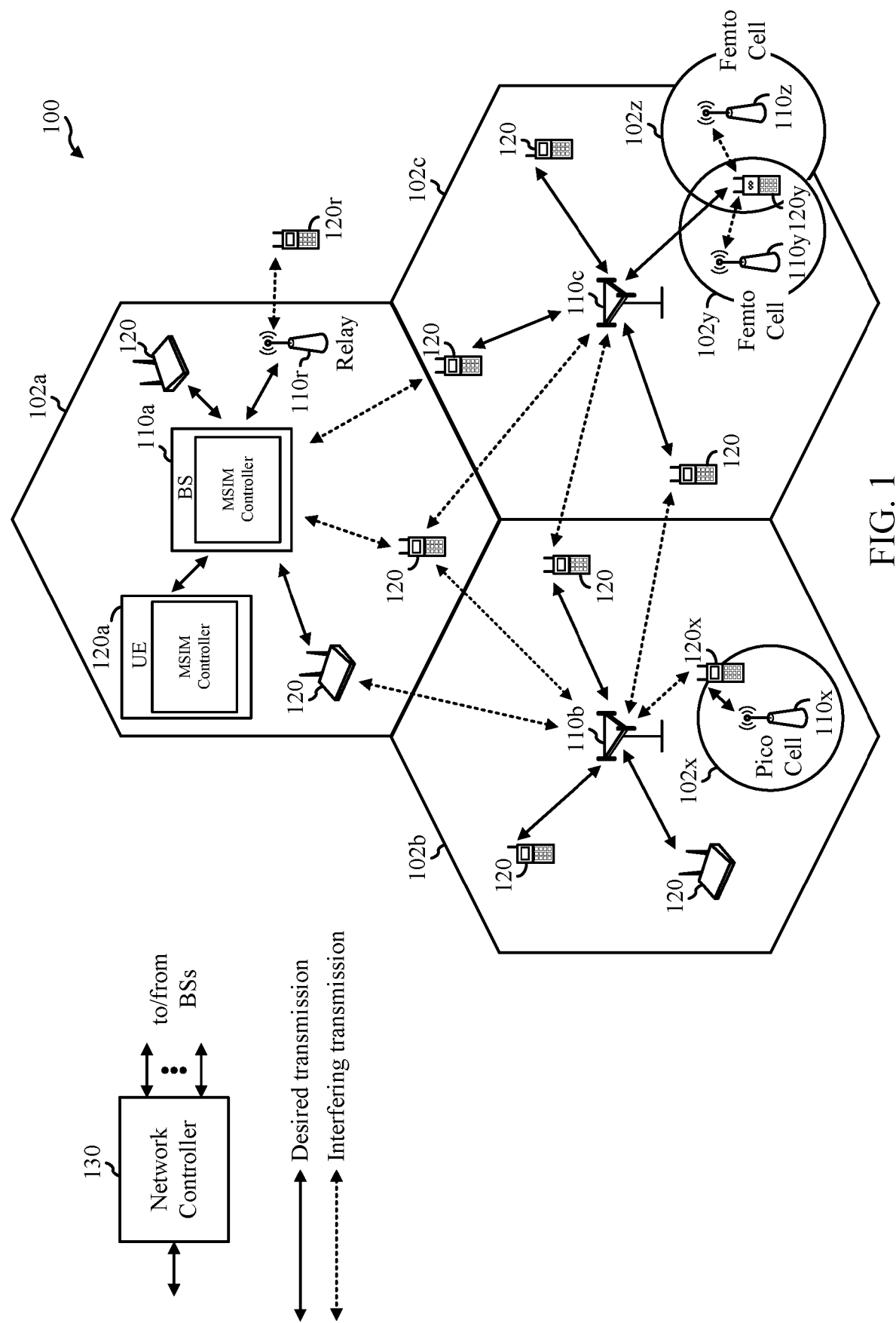
FIG. 1 is a block diagram conceptually illustrating an example telecommunications system, in accordance with certain aspects of the present disclosure.

Aspects of the present disclosure provide apparatus, methods, processing systems, and computer readable mediums for communicating information regarding a multi-subscriber identity module (SIM) capability of a UE, such as registering tune-away period configurations and synchronizing configuration states between the UE and the network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS), LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd. Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system a 5G NR network). For example, as shown in FIG. 1, the UE 120a has a multi-subscriber identity module (SIM) controller that may be configured for communicating information regarding the MSIM capability of the UE 120, according to aspects described herein. The BS 110a has a multi-subscriber identify module (SIM) controller that may be configured for receive and register information regarding MSIM capability of the UE 120, according to aspects described herein.

As illustrated in FIG. 1, the wireless communication network 100 may include a number of base stations (BSs) 110 and other network entities, A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a LTE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE, In some examples, multi-layer transmissions with up to 2 streams per UE may be supported, Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink A finely dashed line with double arrows indicates potentially interfering transmissions between a UE and a BS.

Figure 2:
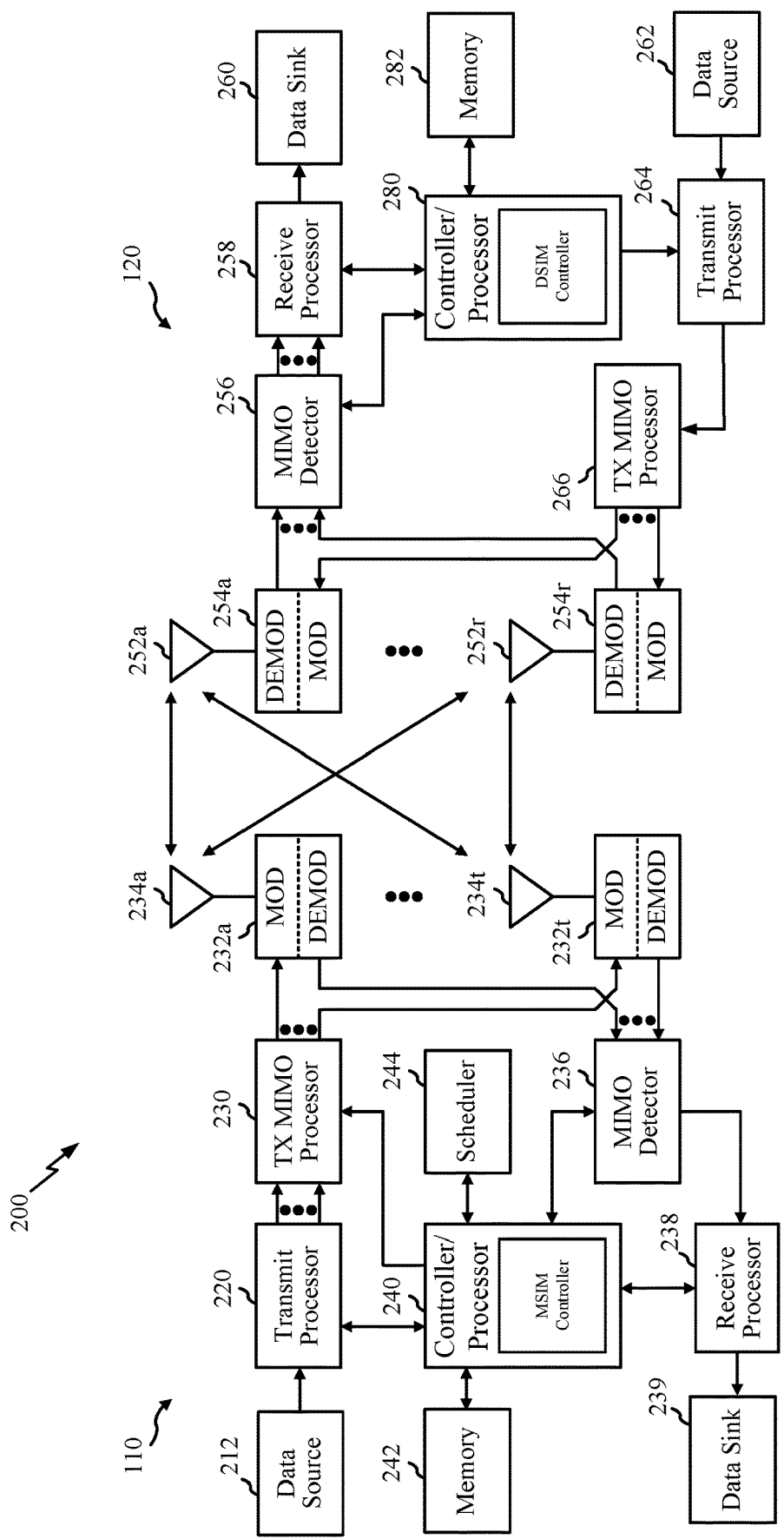
FIG. 2 is a block diagram illustrating an example architecture of a distributed radio access network (RAN), in accordance with certain aspects of the present disclosure.

FIG. 2 illustrates example components of BS 110 and UE 120 e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a multi-subscriber identify module (SIM) controller that may be configured for receive and register information regarding MSIM capability of the UE 120, according to aspects described herein. The controller/processor 280 of the UE 120 also includes an MSIM controller that may be configured for communication information regarding the MSIM capability of the UE 120, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Signaling Protocol for Multi-Subscriber Identity Module (SIM) Deployment New radio (NR) concurrent radio-access technology (RAT) operation generally refers to operating multiple simultaneous active connections with at least one connection being on NR. For example, the two connections may involve LTE and NR connections, or both NR connections. Multi-subscriber identify module (SEM) devices are able to connect to multiple networks independently without network awareness. Different UE behaviors may occur based on different implementations like dual-SIM dual active (DSDA) or dual-SINE dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

For a UE with DSDS deployment, two technologies may share the same set of RE components. Therefore, performance degradation may be experienced on one SIM due to various issues related to UE and network mismatch when the UE engages in activities for another SIM. For example, the receiver (Rx) and transmitter (Tx) chain in multi-SIM (MSIM) UEs may only be able to tune to a single network at a time, and therefore the two or more network interfaces cannot operate simultaneously. Instead, the UE may monitor multiple interfaces in a standby mode by tuning to one network (e.g., corresponding to a first radio access technology (RAT), such as NR) and then to the other network (e.g., corresponding to a second RAT, such as NR or LTE). For example, the radio may connect to a first network and periodically tune-away to other networks on standby to maintain service. In this tune-away procedure, the radio tunes to the standby network for a relatively short time and then tunes back to the first network to continue a voice or data call. This tune-away procedure allows the mobile device to monitor for pages (e.g., pages associated with maintaining connections to a network and indicating incoming calls) received on the standby network(s). If a page is received, a UE may automatically switch networks to answer an incoming telephone call.

The multiple SIMS of the multi-SIM deployment of the UE may belong to different network carriers. For example, for a first SIM and a corresponding NW carrier, the network may be unaware of information regarding a second SIM of the UE (e.g., subscriber identifier (ID)/security key). The first SIM may inform the network when the first SIM is to be deactivated or if the first SIM is requesting a special adjustment/release, as described in more detail herein. From the network perspective, the first and second SIMs of the UE may be operated in an independent manner, allowing the first and second SIMs to belong to different network carriers.

Certain aspects of the present disclosure provide a signaling extension for MSIM UEs for communicating information regarding the MSIM configuration to the network. For example, certain aspects provide techniques for UE UE MSIM capability reporting and updating (e.g., whether the UE supports dual receive (DR)-DSDS, single receive (SR)-DSDS, the RAT combination of the SIMs NR/NR, or LTE/NR)), and UE capability update of a state of a second SIM such as deactivation of a second SIM or update to a discontinuous reception (DRX) cycle, or change of the RAT associated with the second SIM.

Certain aspects also provide techniques for requesting UE configuration adjustment. For example, requesting UE configuration adjustment may involve a UE specific DRX cycle or paging position change, UE radio resource control (RRC) connection suspension request, UE tune-away event reporting, informing the network of the pattern, timing, and duration of periodic or aperiodic tune-away events, and resource allocation prescheduling, as described in more detail herein. Certain aspects also provide a recovery mechanism from abnormal states that may be detected, and in some cases, caused by the tune-away periods described herein. Farr example, the recover mechanism may involve downlink (DL) and uplink (UL) link efficiency recovery, secondary cell (SCELL) state synchronization, UL timing synchronization, or bandwidth part (BWP) synchronization with the network.

Certain aspects provide discovery techniques for an extended signaling protocol which may be used for communicating capability information associated with the MSIM deployment. For example, the UE and network entity may exchange information regarding whether each of the UE and network entity support the extended signaling protocol.

Figure 3:
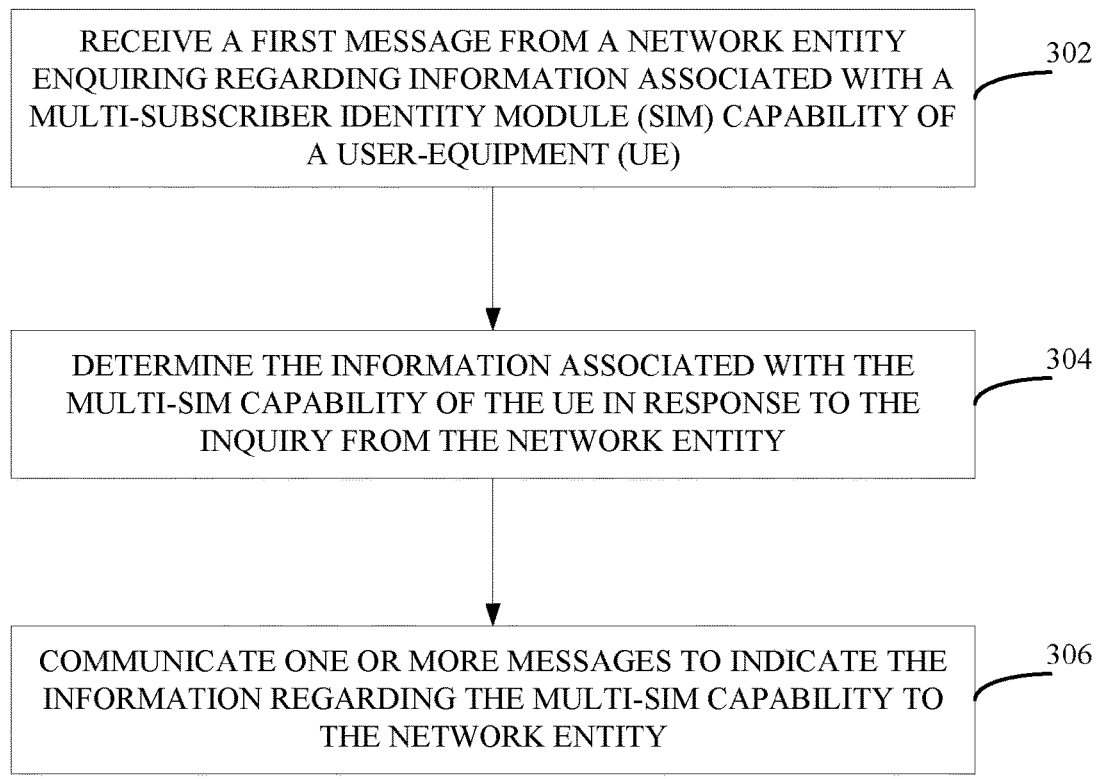
FIG. 3 is a flow diagram illustrating example operations for wireless communication, in accordance with certain aspects of the present disclosure.

FIG. 3 is a flow diagram illustrating example operations 300 for wireless communication, in accordance with certain aspects of the present disclosure. The operations 300 may be performed, for example, by a UE (e.g., such as the UE 120 in the wireless communication network 100).

Operations 300 may be implemented as software components that are executed and run on one or more processors (e.g., controller/processor 280 of FIG. Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 begin, at block 302, by the UE receiving a first message from a network entity enquiring regarding information associated with a MSIM capability of the UE, and at block 304, the UE determining the information associated with the MSIM capability of the UE in response to the inquiry from the network entity. At block 306, the UE communicates one or more messages to indicate the information regarding the multi-SIM capability to the network entity.

Figure 4:
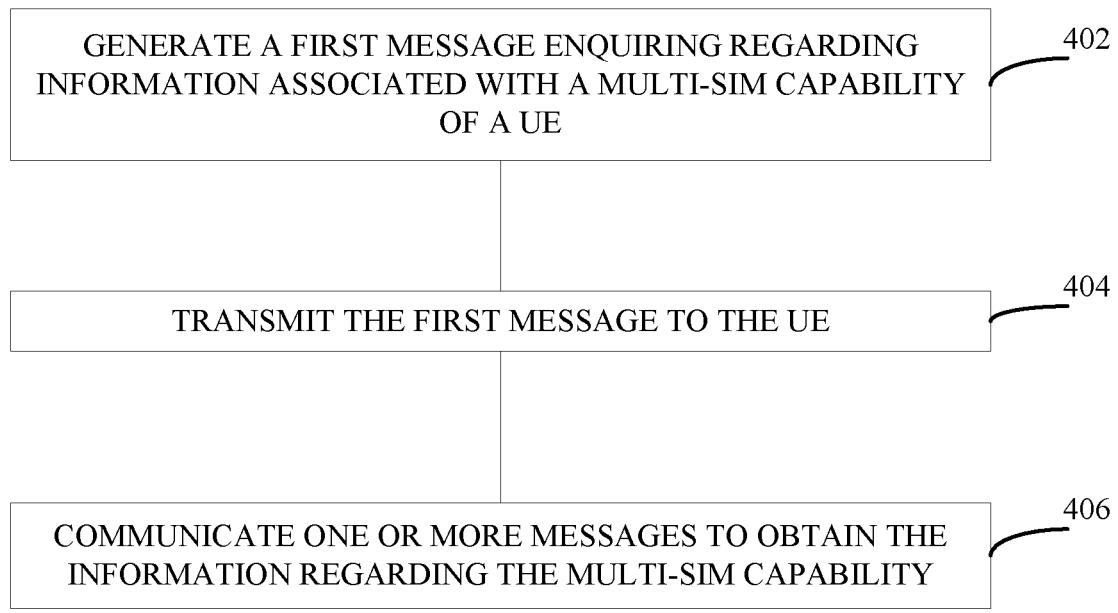
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a network entity (e.g., such as a BS 110 in the wireless communication network 100). The operations 400 may be complimentary operations by the network entity to the operations 300 performed by the UE.

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 begin, at block 402, by the network entity generating a first message enquiring regarding information associated with a MSIM capability of a UE, and at block 404, by the network entity transmitting the first message to the UE. At block 406, the network entity communicates one or more messages to obtain the information regarding the MSIM capability.

Certain aspects may also involve the UE receiving a system information block (SIB) indicating that the network entity supports a signaling protocol (e.g., referred to herein as an extended NR signaling (ENS) protocol), the one or more messages being communicated in response to the indication that the network entity supports the signaling protocol. In other words, the extended NR signaling discovery may involve the network broadcasting a system information block (e.g., SIB1) having padding (e.g., reserve bits) used to identify the network entity as an ENS capable network. In certain aspects, the UE may also transmit an extended signaling message identifying the UE as an ENS capable UE. After this discovery procedure, the operations 300 and 400 may begin for communicating the one or more messages indicating the MSIM capability of the UE. In certain aspects, the UE may indicate to the network entity a change of capability, such as a tag change of standard capabilities, or tag change of ENS capabilities.

Figure 5:
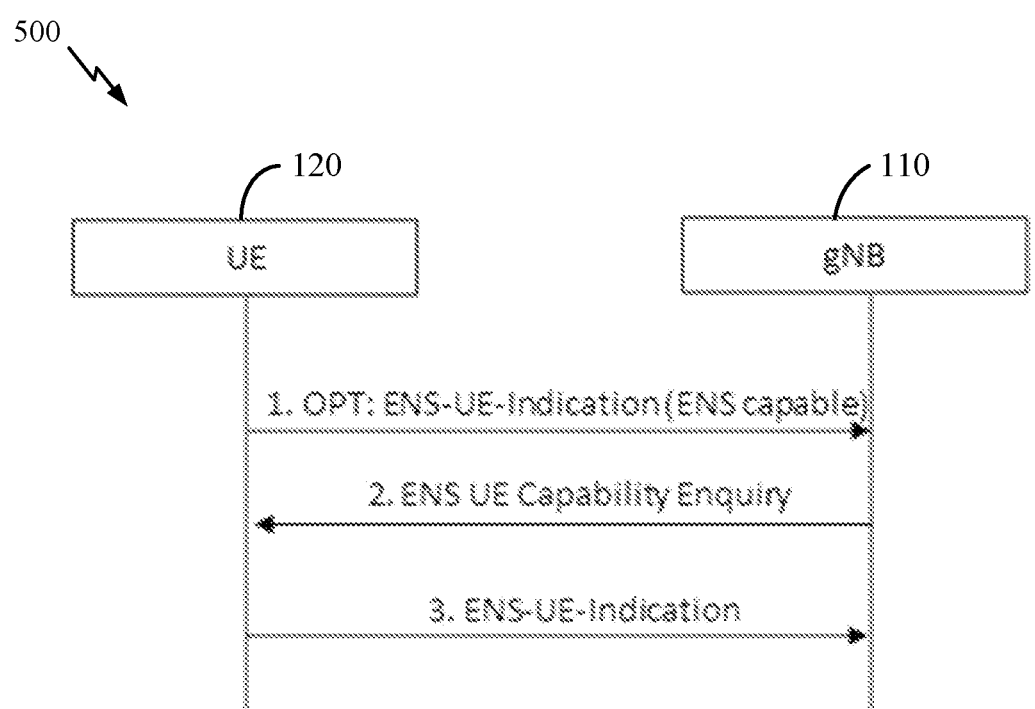
FIG. 5 is a call flow diagram illustrating example operations for discovery of a signal protocol support and capability transfer, in accordance with certain aspects of the present disclosure.

FIG. 5 is a call flow diagram 500 illustrating example operations for discovery of ENS protocol support and capability transfer, in accordance with certain aspects of the present disclosure. As illustrated, at step 1 of the call flow diagram 500, the UE 120 may optionally transmit an indication to the network entity that the UE is ENS capable. At step 2 of the call flow diagram 500, the network entity 110 (e.g., gNB) may transmit a message enquiring about the UE capability associated with the MSIM capability, and at step 3, the UE 120 may transmit an ENS capability report indicating the UE capability.

The ENS capability report may indicate the capability of the UE 120 with respect to MSIM, such as whether the UE 120 supports DSDA, SR-RSDS, or DR-DSDS. The UE may also indicate the type of a RAT associated with a second SIM of the UE (e.g., NR, long-term evolution (LTE), universal mobile telecommunications service (UMTS), global system for mobile communications (GSM)) in addition to the RAT (NR) of the first SIM of the UE 120.

Certain aspects also provide techniques for providing a capability update with regards to the second SIM, a RAT change, or deactivation of the second SIM in a similar manner, but with the second SIM information updated or removed. In certain aspects, the capability exchange may include indications of a supported media access control (MAC) control element (MCE) set, a logical channel identifier (LCID), and multiple gap pattern capability, as described in more detail herein.

In certain aspects, the UE 120 may transmit a UE 120 configuration adjustment request to the network entity, which may involve a UE specific DRX cycle or paging position change, and UE RRC connection suspend or RRC connection release with resource block (RB) suspend (e.g., replaced by NR RRC connection resume). For example, the UE configuration adjustment request may request that an adjustment be made to UE specific DRX cycle during an idle mode of operation at the UE. For example, the UE may negotiate a preferred DRX with the network entity to adjust the DRX cycle, as described in more detail with respect to FIGS. 6A-6C.

Figure 6A:
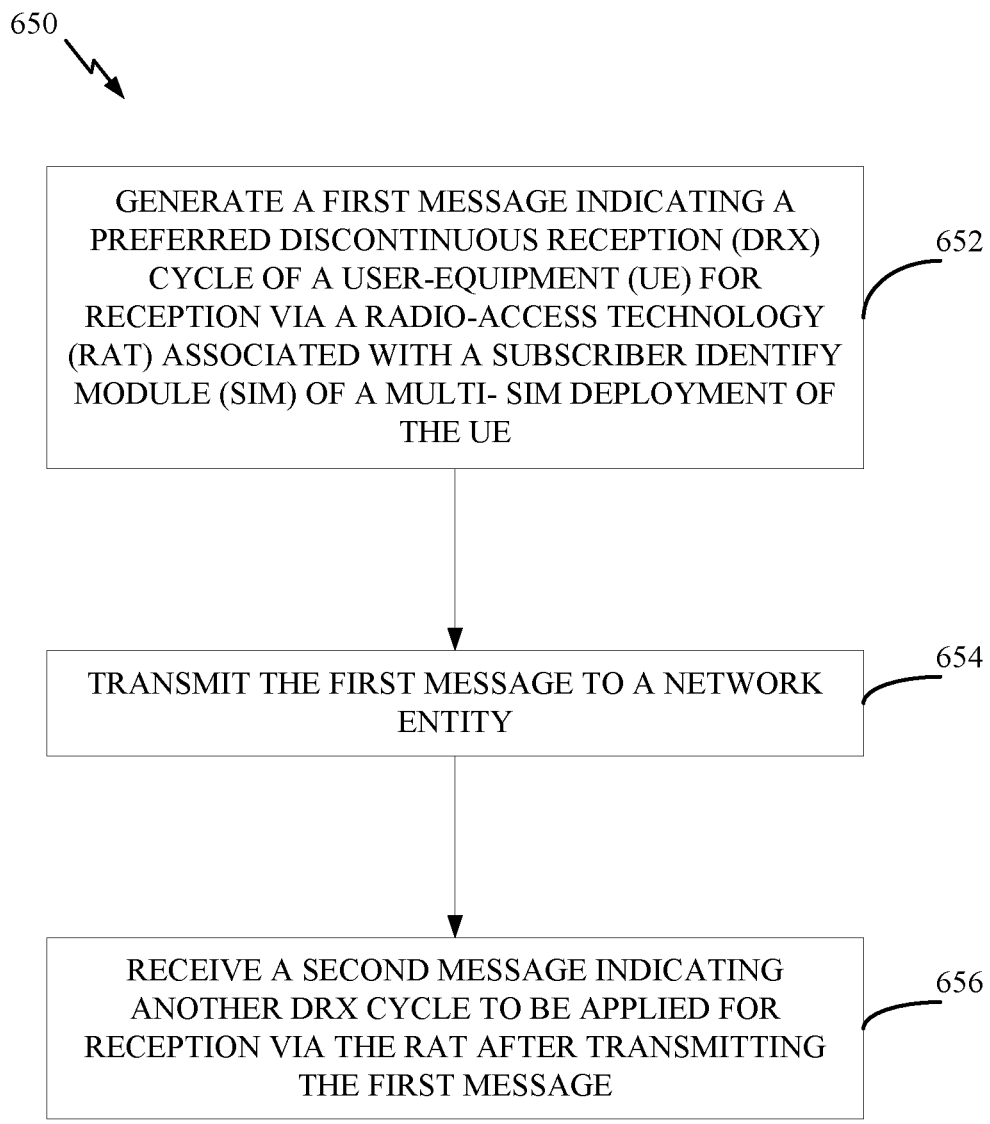
FIG. 6A is a flow diagram illustrating example operations for wireless communication, in accordance with certain aspects of the present disclosure.

FIG. 6A is a flow diagram illustrating example operations 650 for wireless communication, in accordance with certain aspects of the present disclosure. The operations 650 may be performed by a UE (e.g., UE 120).

The operations 650 begin, at block 652, by generating a first message indicating a preferred discontinuous reception (DRX) cycle of a user-equipment (UE) for reception via a radio-access technology (RAT) associated with a subscriber identify module (SIM) of a multi-SIM deployment of the UE, at block 654, transmitting the first message to a network entity, and at block 656, receiving a second message indicating another DRX cycle to be applied for reception via the RAT after transmitting the first message.

Figure 6B:
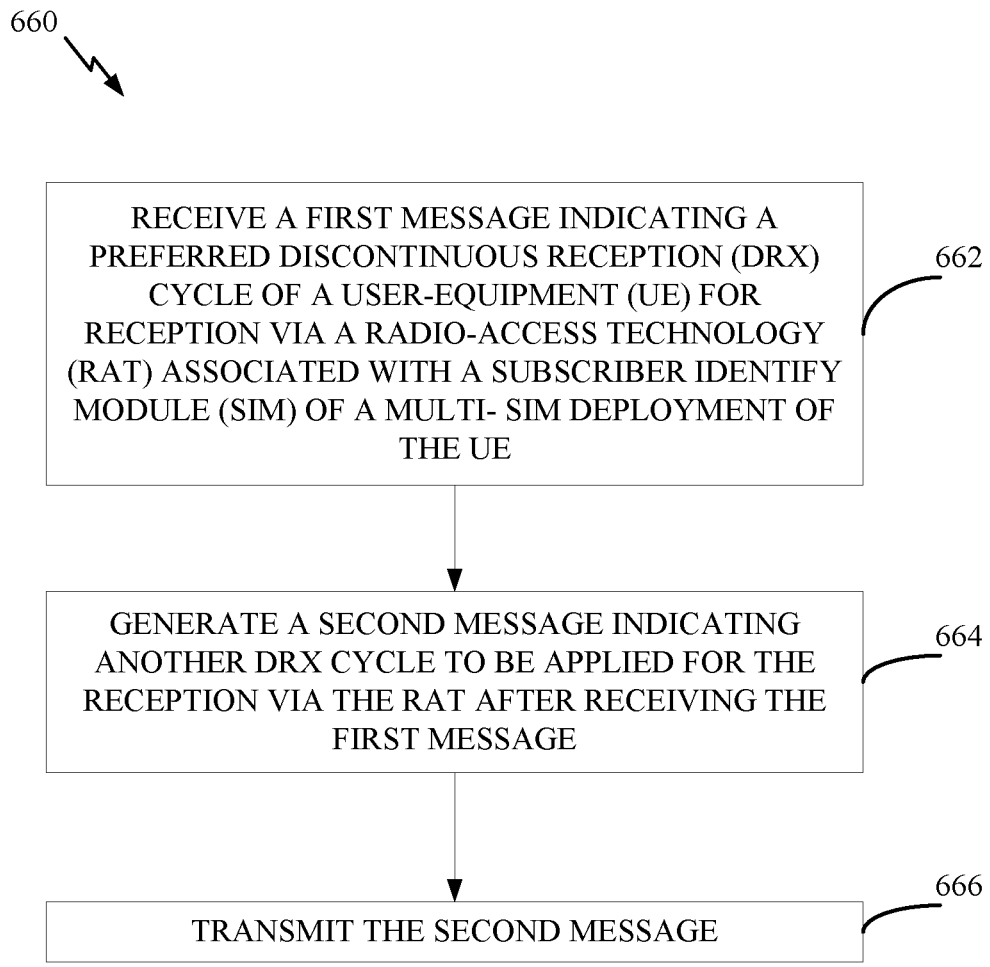
FIG. 6B is a flow diagram illustrating example operations for wireless communication, in accordance with certain aspects of the present disclosure.

FIG. 6B is a flow diagram illustrating example operations 660 for ireless communication, in accordance with certain aspects of the present disclosure. The operations 660 may be performed by a network entity.

The operations 660 begin, at block 662, by receiving a first message indicating a preferred discontinuous reception (DRX) cycle of a user-equipment (UE) for reception via a radio-access technology (RAT) associated with a subscriber identify module (SIM) of a multi-SIM deployment of the UE, at block 664, generating a second message indicating another DRX cycle to be applied for the reception via the RAT after receiving the first message, and at block 666, transmitting the second message.

Figure 6C:
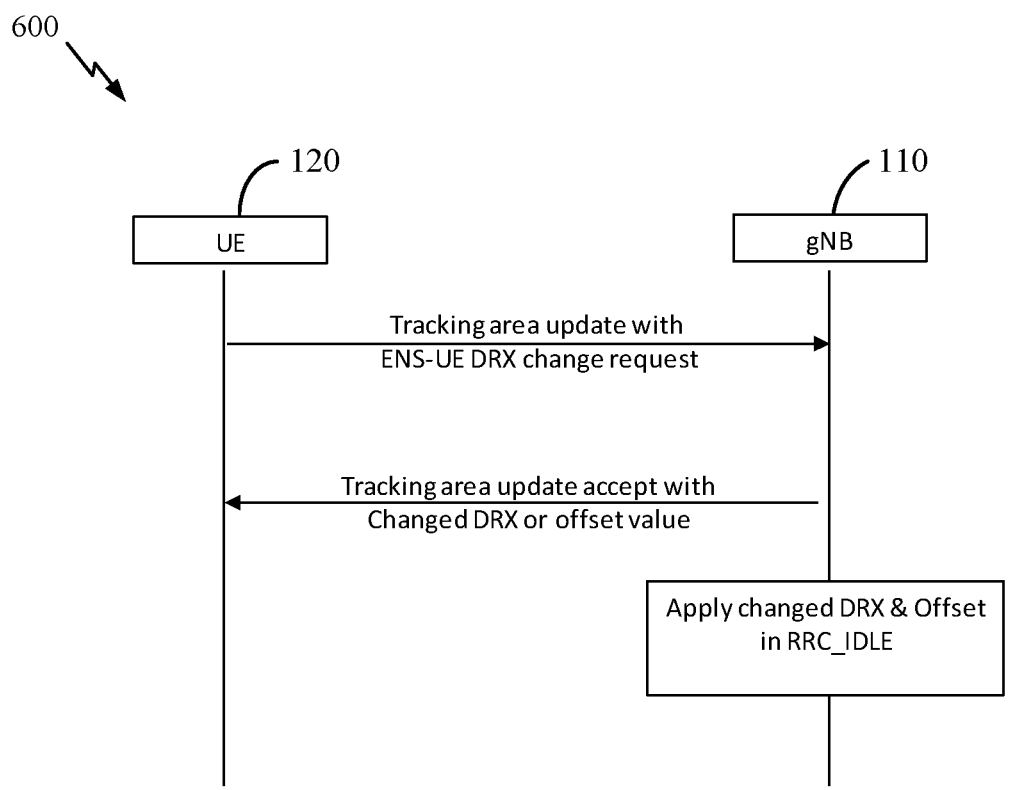
FIG. 6C is a call flow diagram illustrating communication of tracking area update (TAU) messages for negotiating a discontinuous reception (DRX) cycle, in accordance with certain aspects of the present disclosure.

FIG. 6C is a call flow diagram illustrating example operations 600 for negotiating a DRX cycle (e.g., paging cycle), in accordance with certain aspects of the present disclosure. As illustrated, the UE may transmit a tracking area update (TAU) message, indicating a DRX change request. For example, there may be a scenario where two sub paging occasions collide with each other when using a certain DRX cycle. Therefore, certain aspects of the present disclosure allow a UE 120 to indicate a preferred DRX cycle to the network entity, reducing the likelihood of paging collision.

The DRX change request may indicate a preferred DRX cycle of the UE 120. The preferred DRX cycle may be indicated using an offset value with reference to a reference DRX cycle. The network entity 110 (e.g., gNB) may then response with a TAU accept message. The TAU accept message may either accept the preferred DRX cycle of the UE 120, or indicate a different DRX cycle to be used. For example, the network entity 110 may indicate an offset value with reference to the preferred DRX cycle indicated by the UE 120. The network entity 110 may then apply the negotiated DRX cycle (e.g., changed DRX cycle and offset) for the UE 120 while the UE 120 is in RRC idle mode. By allowing for the negotiation of the DRX cycle, page collision between the different sub paging occasions (e.g. used for gaming) may be reduced.

Certain aspects of the present disclosure are generally directed to a UE specific connected-mode DRX (CDRX) cycle and offset adjustment request. Certain aspects, provide a protocol to allow the UE to negotiate with the network regarding a preferred CDRX configuration including CDRX length and offset. This protocol for negotiating a CDRX configuration may increase power savings by allowing a UE to request a longer CDRX length (e.g., for both single SIM or multi-SIM configurations), while also allowing for the avoidance of collision between one CDRX subsystem and another CDRX or DRX page occasion (e.g., for DSDS MSIM specific configuration). The protocol also allows for the avoidance of transmit and receive interference between two subsystems (e.g., for DSDA MSIM).

Figure 7:
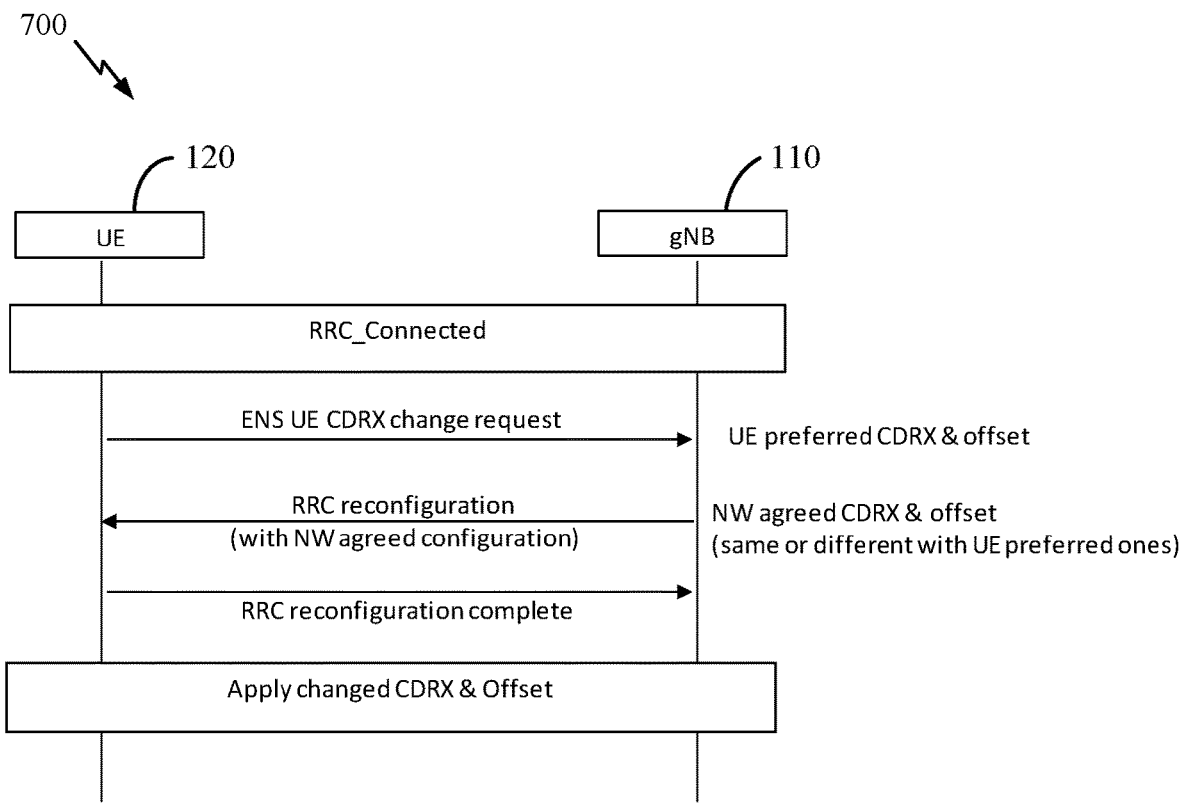
FIG. 7 is a call flow diagram illustrating example operations for negotiating a connected-mode DRX (CDRX) cycle, in accordance with certain aspects of the present disclosure.

FIG. 7 is a call flow diagram illustrating example operations 700 for negotiating a CDRX cycle, in accordance with certain aspects of the present disclosure. As illustrated, the UE 120 may be in RRC connected mode and may transmit a CDRX change request to the network entity 110, indicating a preferred CDRX and offset value. The network entity 110 may then respond with an RRC reconfiguration message including the network agreed CDRX and offset, which may be the same or different than the preferred CDRX cycle indicated by the UE 120. The UE 120 may then transmit an RRC reconfiguration completely message, after which the negotiated CDRX and offset may be applied for communication.

The negotiation of the CDRX cycle and offset value allows for power saving and reduction of CDRX collision with other sub paging occasions for a DSDS system. Negotiating the CDRX cycle and offset value may also reduce CDRX receive interference during transmissions of the other subsystem (e.g., transmission for a RAT of a second SIM) assuming a DSDA system is implemented.

Figure 8A:
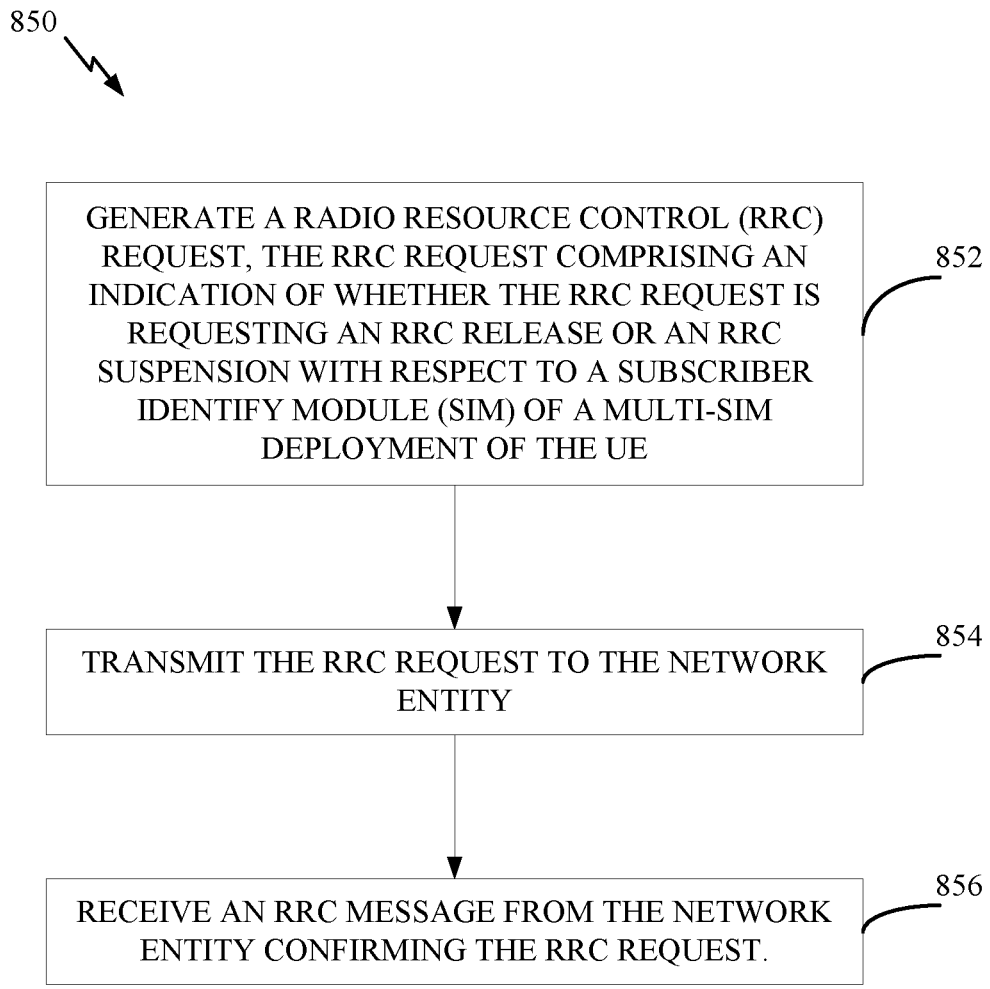
FIG. 8A is a flow diagram illustrating example operations for wireless communication, in accordance with certain aspects of the present disclosure.

FIG. 8A is a flow diagram illustrating example operations 850 for wireless communication, in accordance with certain aspects of the present disclosure. The operations 850 may be performed by a UE (e.g., UE 120).

The operations 850 begin, at block 852, by generating a radio resource control (RRC) request, the RRC request comprising an indication of whether the RRC request is requesting an RRC release or an RRC suspension with respect to a subscriber identify module (SIM) of a multi-SIM deployment of the UE, at block 854, transmitting the RRC request to a network entity, and at block 856, receiving an RRC message from the network entity confirming the RRC request.

Figure 8B:
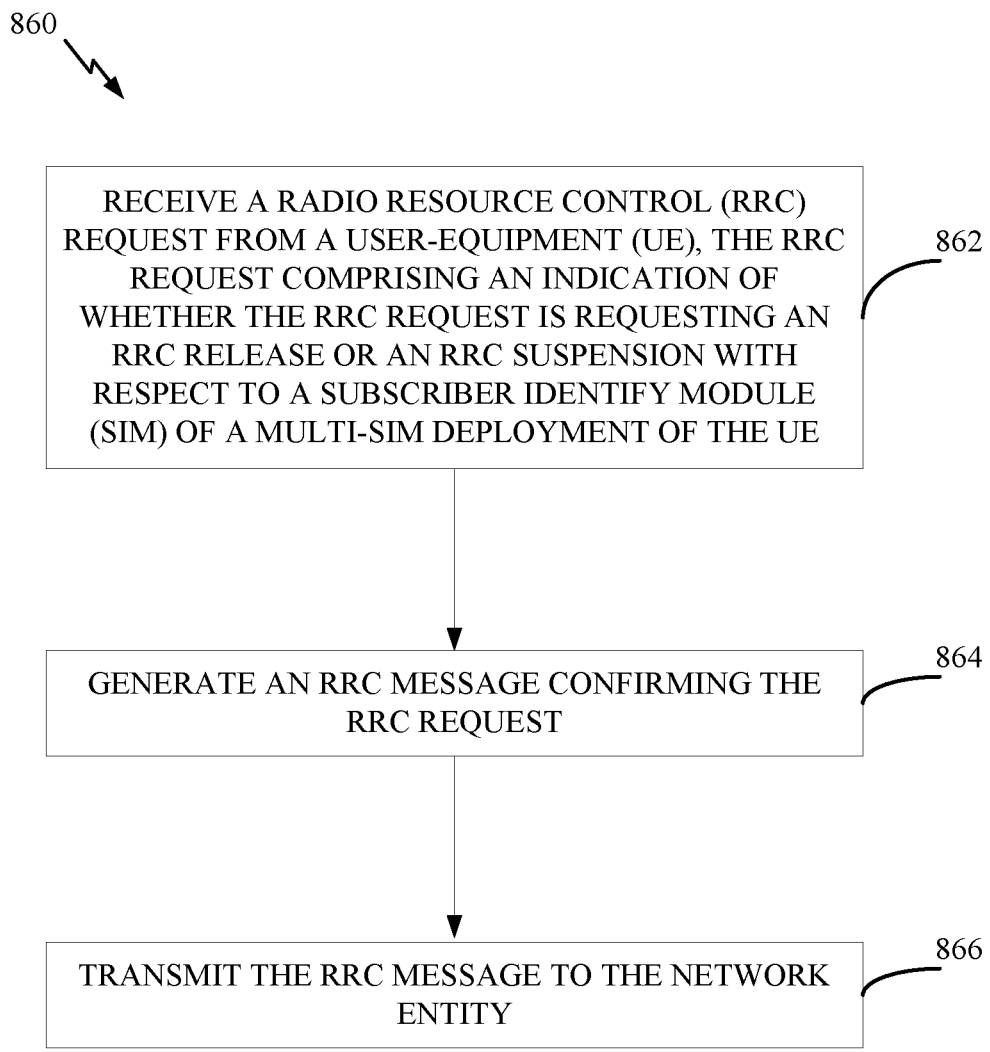
FIG. 8B is a flow diagram illustrating example operations for wireless communication, in accordance with certain aspects of the present disclosure.

FIG. 8B is a flow diagram illustrating example operations 860 for wireless communication, in accordance with certain aspects of the present disclosure. The operations 860 may be performed by a network entity.

The operations 860 begin, at block 862, by receiving a radio resource control (RRC) request from a user-equipment (UE), the RRC request comprising an indication of whether the RRC request is requesting an RRC release or an RRC suspension with respect to a subscriber identify module (SIM) of a multi-SIM deployment of the UE, at block 864, generating an RRC message confirming the RRC request, and at block 866, transmitting the RRC message to the UE.

Figure 8C:
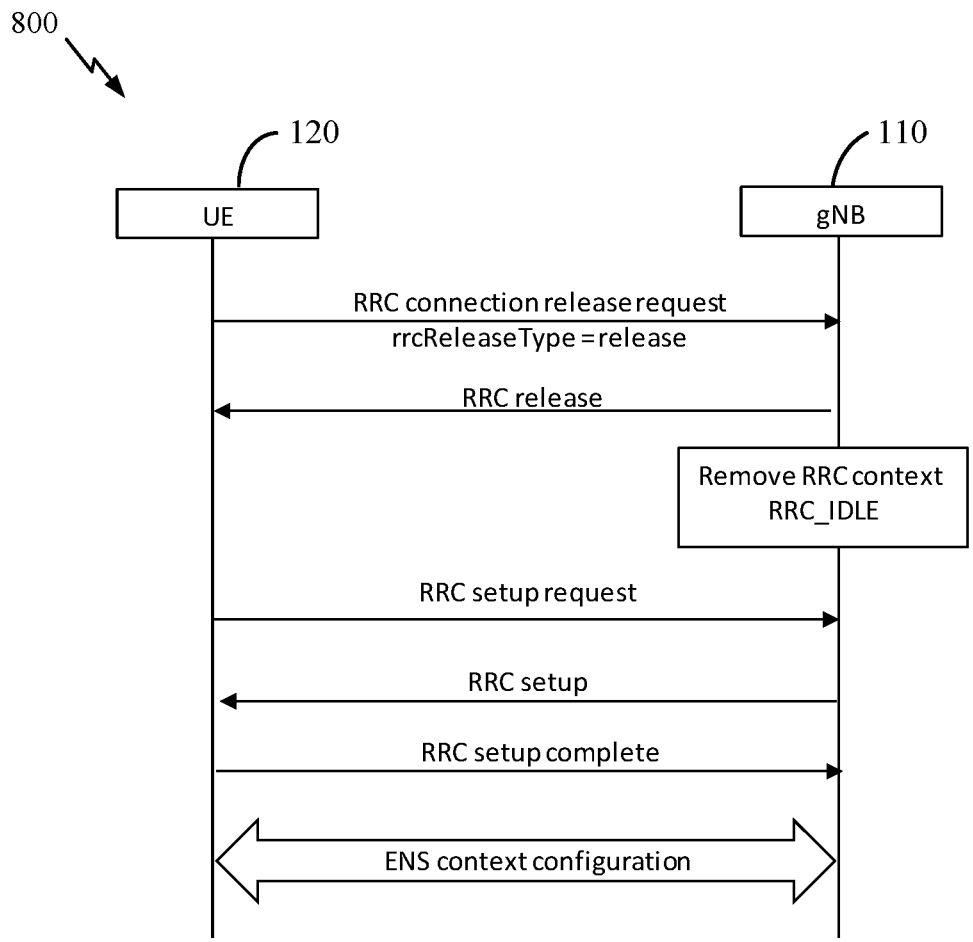
FIG. 8C is a call flow diagram illustrating example operations for requesting radio resource control (RRC) release of a user-equipment (UE), in accordance with certain aspects of the present disclosure.

FIG. 8C is a call flow diagram illustrating example operations 800 for requesting RRC release of the UE, in accordance with certain aspects of the present disclosure. For example, the UE 120 may send an ENS-RRC connection release request to the network entity 110 having an indication (e.g., rrcReleaseType field) that indicates whether the request is for RRC release or suspension. As illustrated in FIG. 8C, the UE may send an RRC release request with an indication (e.g., rrcReleaseType field) that the request is for an RRC release of the UE 120. The network entity 110 then sends an RRC release message. The network entity 110 then assumes that the UE will enter an RRC idle mode and removes the RRC context of the UE, as illustrated. The UE may later send an RRC setup request, receive an RRC setup message, and transmit an RRC setup complete message to reenter RRC connected mode, after which ENS context configuration may be communicated between the UE 120 and the network entity 110, as described herein.

When a UE decides to respond to a page in a second system corresponding to a second SIM of the UE, or when the UE needs to perform some signaling activity in the second system, the UE may stop the current activity in the first system corresponding to a first SIM of the UE. Without the ability to suspend any ongoing activity for the first system, the UE may autonomously release the RRC connection with the first system, which may be interpreted as an error case by the first system and has the potential to distort the statistics in the first system, and misguide the algorithms that rely on them. Moreover, during the UE's absence, the first system may continue paging the UE which may result in waste of paging resources. Certain aspects of the present disclosure are directed to RRC suspension techniques that allow a UE to temporarily leave and return to the first system in a network-controlled manner.

Figure 9:
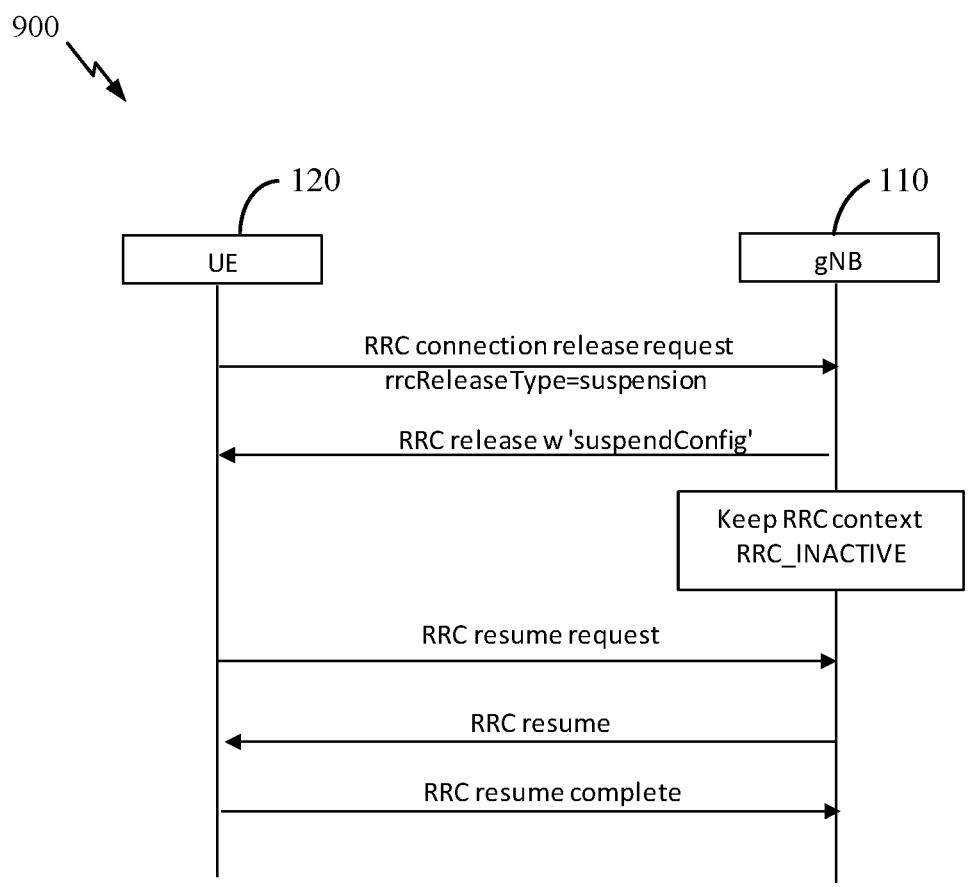
FIG. 9 is a call flow diagram illustrating example operations for requesting RRC suspension of a LTE, in accordance with certain aspects of the present disclosure.

FIG. 9 is a call flow diagram illustrating example operations 900 for requesting RRC suspension of the UE, in accordance with certain aspects of the present disclosure. In this case, the RRC connection release request may indicate (e.g., via the rrcReleaseType field) that the RRC connection release request is requesting a suspension of the RRC connection (e.g., as opposed to a release of the RRC connection). The network entity 110 may then send an RRC release message. In this case, the RRC release message may include an indication (e.g., via an RRCRelease information element(s) (IE)) indicating an RRC suspension configuration (e.g., a paging cycle during the suspension period). The network entity 110 then assumes the UE 120 is in RRC inactive state and keeps the UE's ENS context.

The UE 120 may then resume the RRC connected mode by transmitting an RRC connection resume message, which may be followed by an RRC resume message transmitted by the network entity 110, and a transmission of an RRC resume, complete message from the UE 120. In certain aspects, the network entity 110 may optionally send an RRC reconfiguration to reconfigure the ENS setup after RRC resume is complete.

Certain aspects of the present disclosure are generally directed to an ENS protocol implemented using a specific logical channel identifier (LCID), as described in more detail herein. An ENS protocol supported network entity may be able to handle a MAC control element (MCE) with a specified LCID.

Figure 10A:
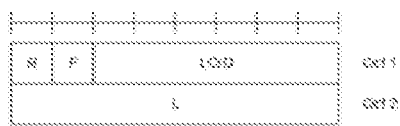
FIGS. 10A and 10B illustrate MCEs having LCID fields, in accordance with certain aspects of the present disclosure.
Figure 10B:
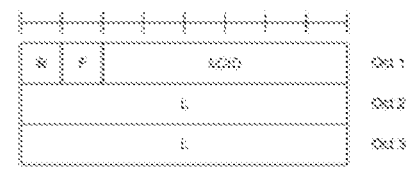

FIGS. 10A and 10B illustrate MCEs 1002, 1004 having LCID fields, in accordance with certain aspects of the present disclosure. The LCID of the MCE may be used to indicate that the MCE is for a purpose such as for a UE periodic/aperiodic tune-away gap registration and update, UE periodic gap deregistration, UE tune-back indication, UE physical uplink shared channel (PUSCH) prescheduling, SCELL state synchronization, downlink (DL)/uplink (UL) spectrum efficiency recovery, UL timing synchronization, and bandwidth part (BWP) synchronization, as described in more detail herein. The length of ENS MAC CE may be variable when reporting different MSIM events, as illustrated in FIGS. 10A, and 10B. In certain aspects, an MCE may be piggybacked on data payloads on an UL-shared channel (SCH). The ENS MCE may be identified by a MAC protocol data unit (PDU) subheader with the LCID specified by an ENS network entity in the ENS configuration for UL and DL separately. For example, different ENS MCEs may be indicated by a type field of the MCE.

Figure 11:
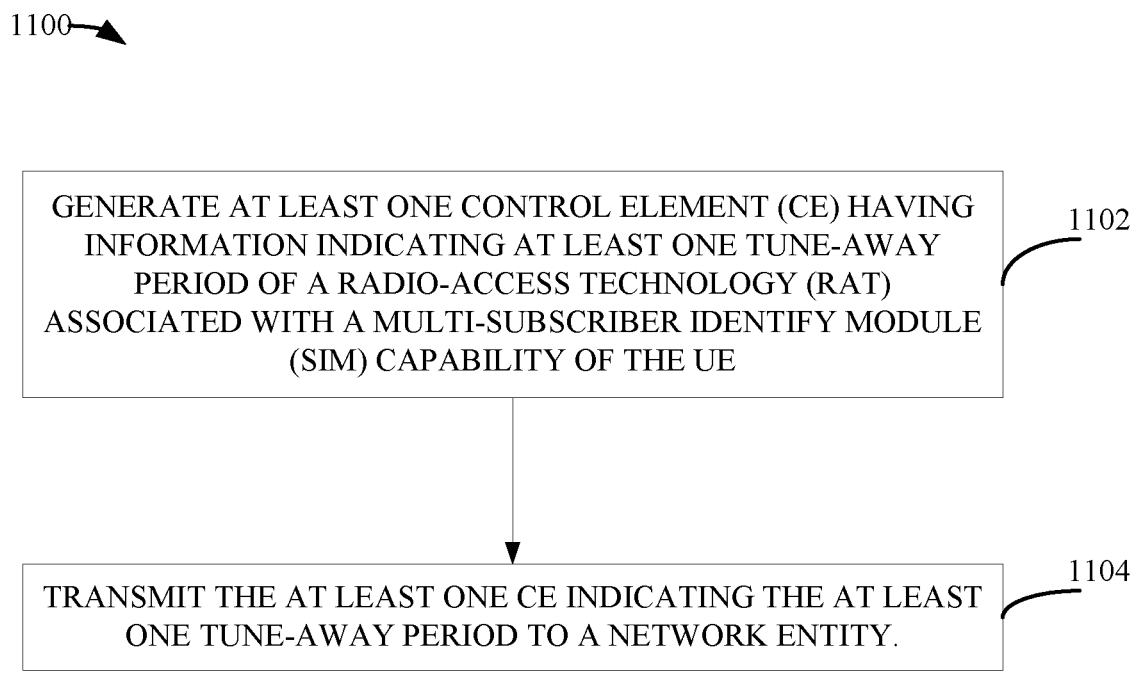
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 120 in the wireless communication network 100).

Operations 1100 may be implemented as software components that are executed and run on one or more processors (e.g., controller/processor 280 of FIG. 2). Further, the transmission and reception of signals by the UE in operations 300 may be enabled, for example, by one or mare antennas (e.g., antennas 252 of FIG. 2). In certain aspects, the transmission and/or reception of signals by the UE may be implemented via a bus interface of one or more processors (e.g., controller/processor 280) obtaining and/or outputting signals. The operations 1100 begin, at block 1102, by the UE 120 generating at least one control element (CE) (e.g., MAC CE (MCE)) having information indicating at least one tune-away period of a RAT associated with a multi-SIM capability of the UE. At block 1104, the UE transmits the at least one CE indicating the at least one tune-away period to a network entity.

Figure 12:
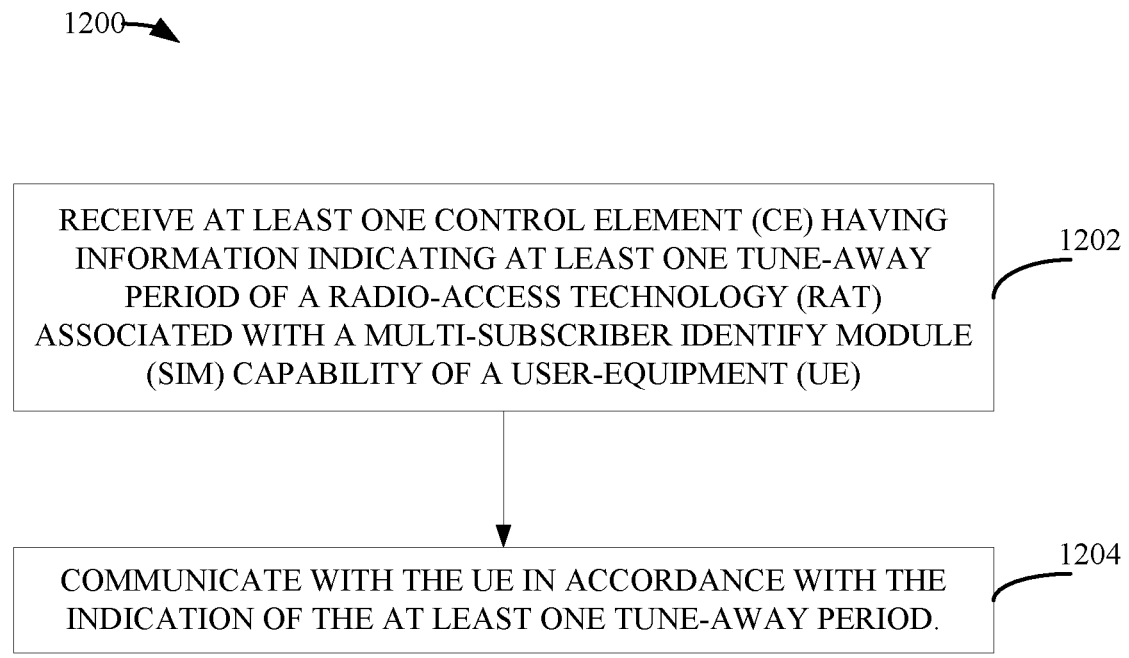
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a network entity (e.g., such as a BS 110 in the wireless communication network 100). The operations 1200 may be complimentary operations by the network entity to the operations 1100 performed by the UE.

Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 begin, at block 1202, by the network entity 110 receiving at least one control element (CE) having information indicating at least one tune-away period of a RAT associated with a multi-SIM capability of the UE, and at block 1204, communicating with the UE in accordance with the indication of the at least one tune-away period.

Figure 13:
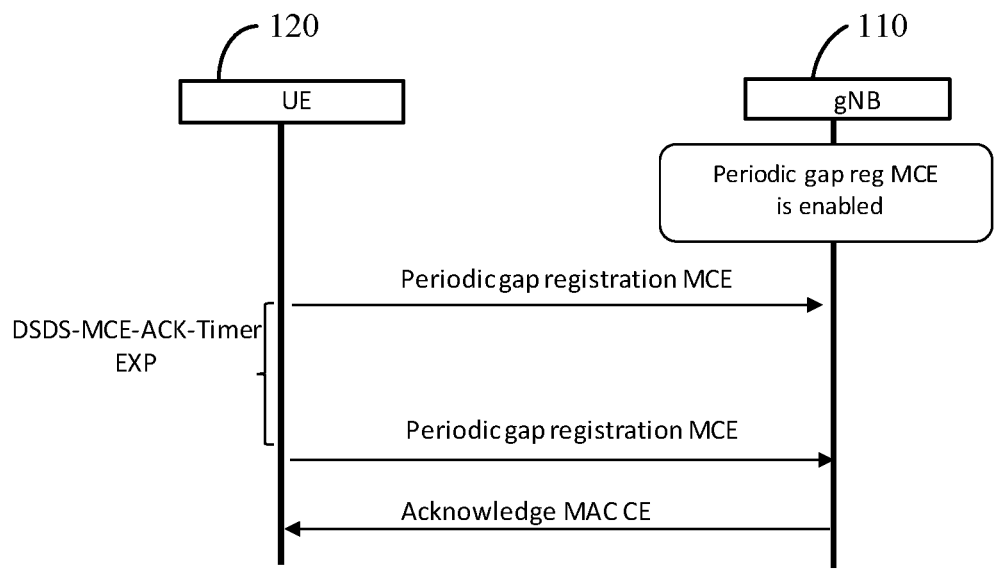
FIG. 13 is a call flow diagram illustrating example operations for registering or updating a periodic tune-away gap configuration, in accordance with certain aspects of the present disclosure.

FIG. 13 is a call flow diagram illustrating example operations 1300 for registering or updating a periodic tune-away gap configuration, in accordance with certain aspects of the present disclosure. An MCE for UE periodic tune-away gap registration and update may be used to register/update periodic tune-away gaps of a RAT (e.g., of a second SIM of the UE) with the network entity. The UE informs the network entity about the periodic gap pattern (e.g., the upcoming start time and the DRX cycle), tune-away type and UE Tx/Rx capability during the tune-away duration via a periodic gap registration MCE, as illustrated. Upon successful UE periodical tune-away gap registration, the network entity 110 is expected to derive ongoing UE periodical gap pattern based on the UE tune-away gap registration for further processing and send an acknowledgement MCE to the UE within a certain time period (e.g., a DSDS-MCE-ACK-Timer). Otherwise, the UE may reseed the periodic registration MCE, as illustrated in FIG. 13 until an acknowledge MCE is sent by the network entity.

In certain aspects, the UE may send another periodic gap registration MCE to update the periodic gap information previously registered. The UE may register multiple periodic gap patterns which may be indicated by different pattern indices.

Figure 14:
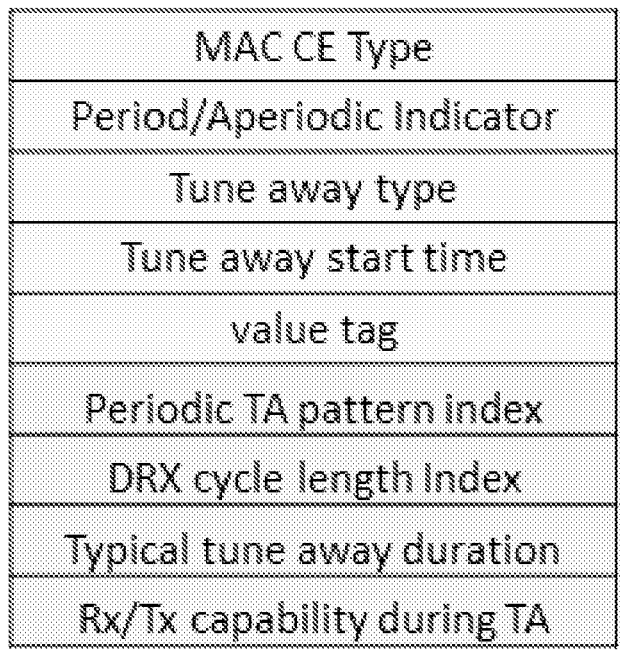
FIG. 14 illustrates fields of a periodic tune-away gap control element, in accordance with certain aspects of the present disclosure.

FIG. 14 illustrates fields of a periodic tune-away gap MCE 1400, in accordance with certain aspects of the present disclosure. As illustrated, the periodic tune-away gap MCE 1400 may include an MCE type indication to indicate whether the MCE 1400 is for a periodic or aperiodic tune away registration or update. The MCE 1400 may also include a tune-away type indication. For example, the tune-away type indication may indicate a full tune-away (e.g., that no Rx/Tx capability is available during tune-away periods on all carriers), or a partial tune-away (e.g., that a limited Rx/Tx capability is available during tune-away periods). The MCE 1400 may also indicate a tune-away start time, which may be indicated in sub-frame or in sub-frame plus an offset within 1 ms. The resolution for indicating the start time may higher than conventional implementations, such as 0.5 ms or 0.25 ms to accommodate various NR slots. The MCE may also include a value tag that may uniquely identify the MCE 1400 and indicate whether network acknowledgement is required.

In certain aspects, the MCE 1400 also includes a periodic timing advance (TA) pattern index, as well as indicate a periodic tune-away pattern, DRX cycle length index, DRX index for the periodic tune-away pattern, a typical tune-away duration for the periodic tune-away periods, and Rx/Tx capability during the tune-away periods. The indications of the MCE 1400 may be reported for each of the active carriers at the UE.

Figure 15:
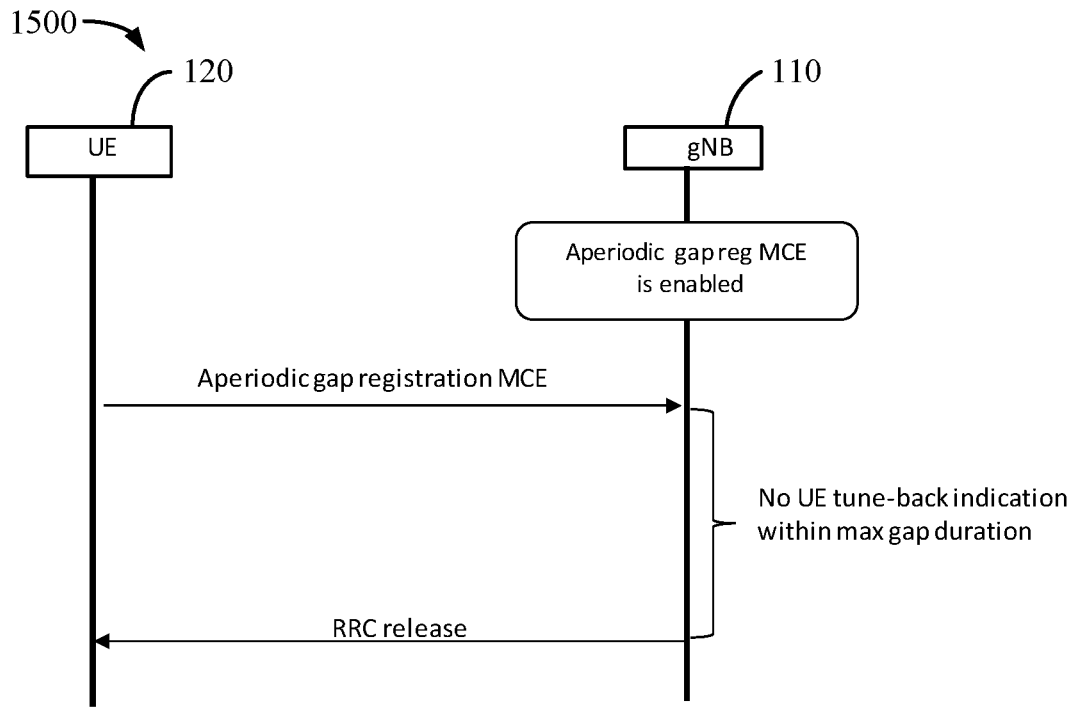
FIG. 15 is a call flow diagram illustrating example operations for registering an aperiodic tune-away gap, in accordance with certain aspects of the present disclosure.

FIG. 15 is a call flow diagram illustrating example operations 1500 for registering an aperiodic tune-away gap, in accordance with certain aspects of the present disclosure. As illustrated, an MCE may be used by the UE 120 to inform the network entity 110 about the aperiodic gap information and supported Tx/Rx capability during the tune-away gap. Network acknowledgement may not be expected by the UE 120 for the aperiodic gap registration MCE. In some cases, the network entity 110 may respond to the UE with a scheduling request (SR) probe to restore DL/UL scheduling accordingly. In certain aspects, when the aperiodic tune-away gap overlaps with a periodic tune-away gap, the network entity 110 may override the periodic tune-away gap temporarily.

In certain aspects, the MCE may indicate a maximum aperiodic tune-away gap duration. When the actual aperiodic tune-away gap duration is longer than the maximum tune-away gap duration reported via the MCE, the network entity 110 may remove the ENS context of the UE 120 and send an RRC release message to the UE 120, assuming that the UE 120 has entered RRC idle mode, as illustrated.

Figure 16:
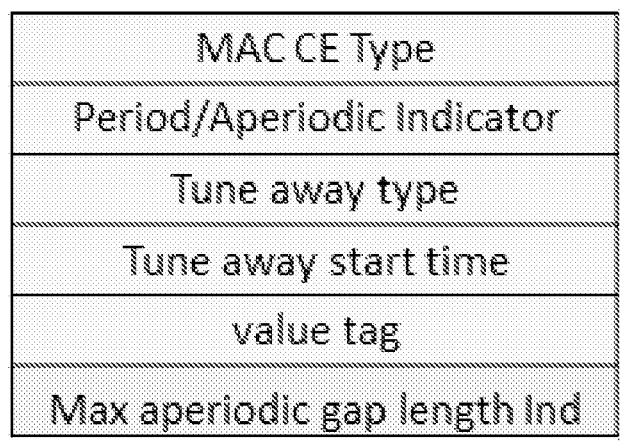
FIG. 16 illustrates a control element for registering an aperiodic tune-away gap, in accordance with certain aspects of the present disclosure.

FIG. 16 illustrates an MCE 1600 for registering an aperiodic tune-away gap, in accordance with certain aspects of the present disclosure. As illustrated, the MCE 1600 for UE aperiodic tune-away gap registration and update may include an MCE type indication, periodic/aperiodic tune-away indicator, tune-away type (e.g., full tune-away, or partial tune-away), tune-away start time, and a value tag similar to the MCE 1400 described for the periodic tune-away gap registration. The MCE 1600 may also include a maximum aperiodic gap length indicator, as described herein.

Figure 17:
FIG. 17 illustrates an acknowledgement control element, in accordance with certain aspects of the present disclosure.

FIG. 17 illustrates an acknowledgement MCE 1700 (e.g., for acknowledging the MCE 1400 for the periodic tune-away gap registration), in accordance with certain aspects of the present disclosure. For example, the network entity may acknowledge the MCE 1400 by sending the acknowledge MCE 1700 within the DSDS-MCE-ACK-Timer as described with respect to FIG. 13, or otherwise, the UE may resend the MCE. The acknowledgment MCE 1700 may include MCE type indication and a value tag uniquely identifying the MCE, as illustrated.

Figure 18:
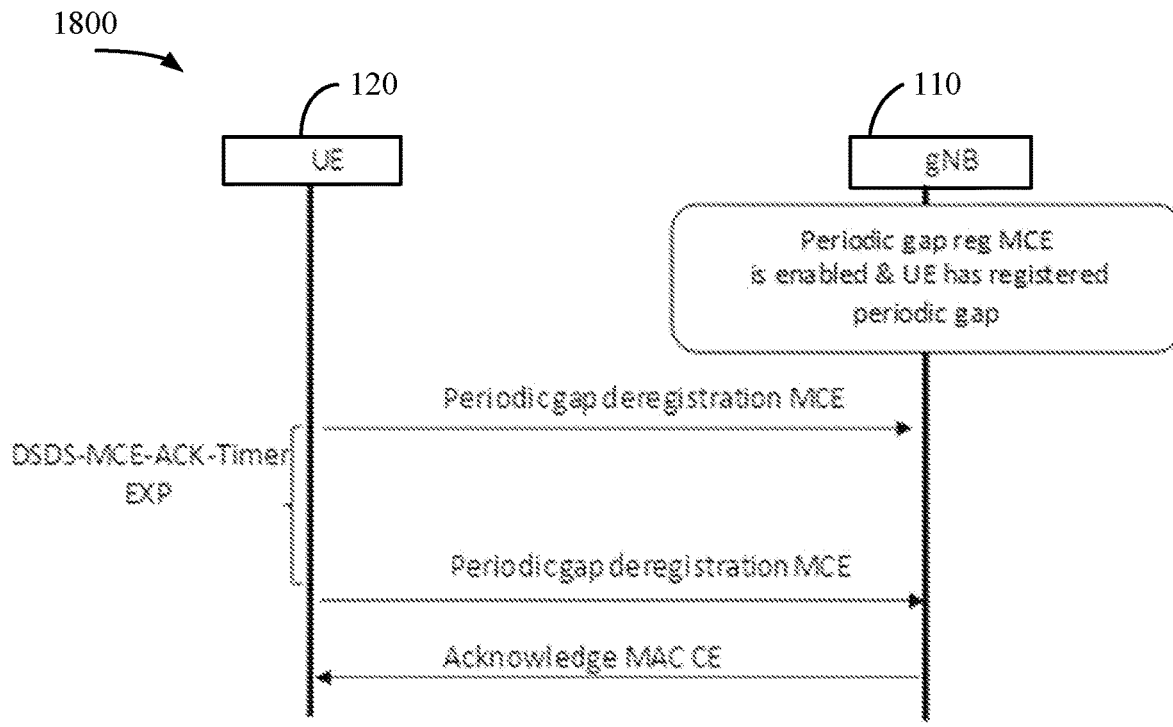
FIG. 18 is a call flow diagram illustrating example operations for periodic tune-away gap deregistration, in accordance with certain aspects of the present disclosure.

FIG. 18 is a call flow diagram illustrating example operations 1800 for periodic tune-away gap deregistration, in accordance with certain aspects of the present disclosure. For example, an MCE may be used to cancel an originally registered periodical tune-away registration identified by a given periodic tune-away pattern. As illustrated, an acknowledgement tinier may also be set for the periodic tune-away gap deregistration, during which the network entity is to send an acknowledgement of the MCE for periodic tune-away gap deregistration. Otherwise, the UE may retransmit the periodic tune-away gap deregistration MCE, as illustrated.

Figure 19:
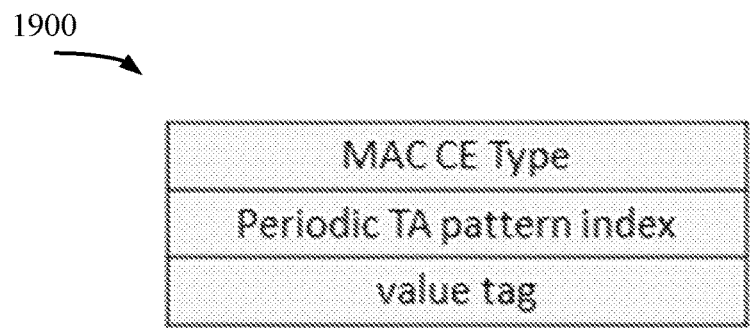
FIG. 19 illustrates a control element for periodic tune-away gap deregistration, in accordance with certain aspects of the present disclosure.

FIG. 19 illustrates an MCE 1900 for periodic tune-away gap deregistration, in accordance with certain aspects of the present disclosure. As illustrated, the MCE 1900 transmitted by the UE used for deregistration may include MCE type indication and a periodic TA pattern index to indicate the periodic tune-away pattern index that is to be deregistered. The MCE 1900 may also include a value tag as described herein.

Certain aspects provide techniques for a UE to transmit a UE tune-back indication to a network entity. For example, the UE 120 may send a tune-back indication MCE to inform the network entity that the UE's Tx/Rx capability has been restored when the aperiodic tune-away gap ends.

Figure 20:
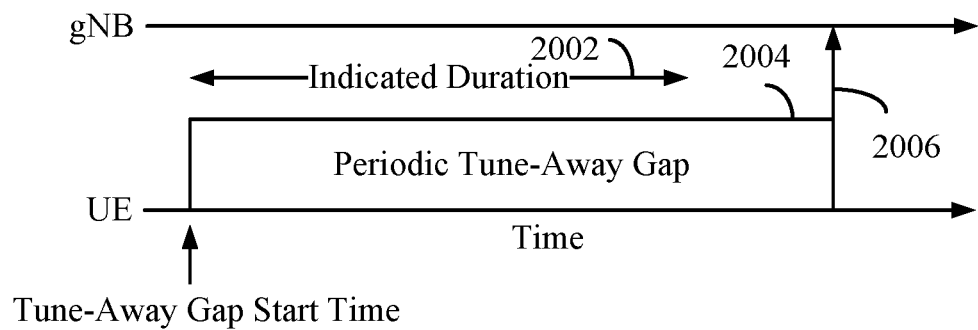
FIG. 20 is a timing diagram illustrating an example periodic tune-away gap, in accordance with certain aspects of the present disclosure.

FIG. 20 is a timing diagram illustrating an example periodic tune-away gap, in accordance with certain aspects of the present disclosure. As illustrated, the indicated duration 2002 (e.g., the tune-away duration indicated via MCE 1400) for the periodic tune-away gaps may be less than an actual duration of the periodic tune-away gap 2004. In this case, the UE 120 may send a tune-back indication MCE 2006 to the network entity 110 indicating that the UE's Tx/Rx capability has been restored, as illustrated.

Figure 21:
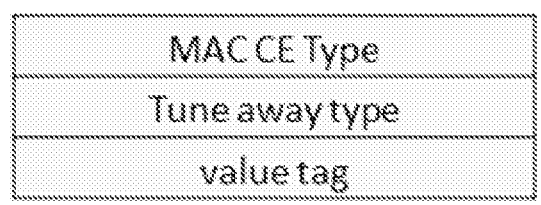
FIG. 21 illustrates a tune-back indication control element, in accordance with certain aspects of the present disclosure.

FIG. 21 illustrates a tune-back indication MCE 2100, in accordance with certain aspects of the present disclosure. As illustrated, the MCE 2100 may include an MCE type indication, a tune-away type to indicate the tune-away gap type (e.g., periodic or aperiodic) of the tune-back MCE, and a value tag as described herein.

Certain aspects provide techniques for a UE PUSCH prescheduling. In some cases, the UE periodic gap pattern, including the reference gap start, gap duration, and Tx/Rx capability of a carrier (e.g., LTE carrier), changes frequently. Therefore, it is important for the UE to be able to update the periodic gap registration in time to keep the UE and the network entity in sync. In certain aspects, the network entity 110 may preschedule resources for the UE to transmit the updated tune-away configurations before the periodic tune-away gap begins in order to reduce the potential gap update delay. In other words, without prescheduling resources for the UE, the UE may have to send a scheduling request (SR) to receive a grant of resources to transmit the updated configuration. By receiving a prescheduled resource pattern, which may be indicated in a PUSCH prescheduling MCE, the UE may transmit the updated configuration with reduced overhead after a periodic tune-away gap has ended.

Figure 22A:
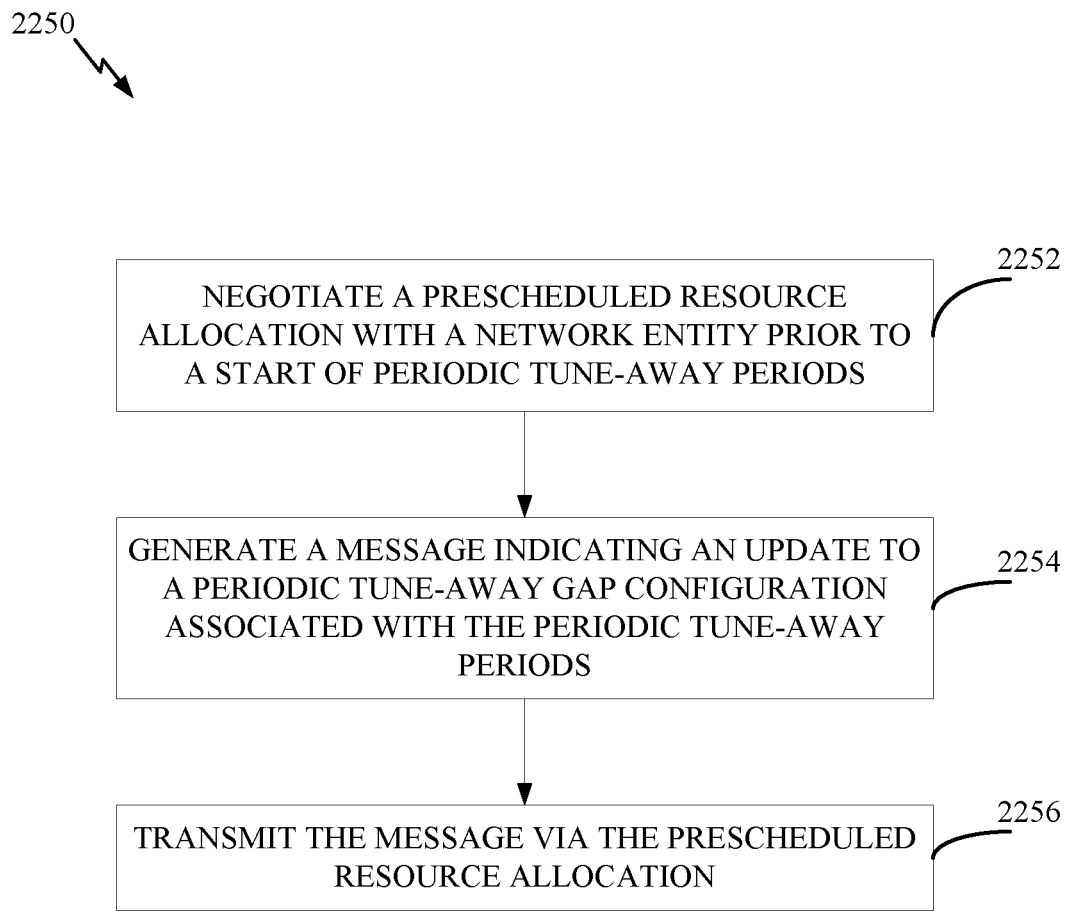
FIG. 22A is a flow diagram illustrating example operations for wireless communication, in accordance with certain aspects of the present disclosure.

FIG. 22A is a flow diagram illustrating example operations 2250 for wireless communication, in accordance with certain aspects of the present disclosure. The operations 2250 may be performed by a UE (e.g., UE 120).

The operations 2250 begin, at block 2252, by negotiating a prescheduled resource allocation with a network entity prior to a start of periodic tune-away periods, at block 2254, generating a message indicating an update to a periodic tune-away gap configuration associated with the periodic tune-away periods, and at block 2256, transmitting the message via the prescheduled resource allocation.

Figure 22B:
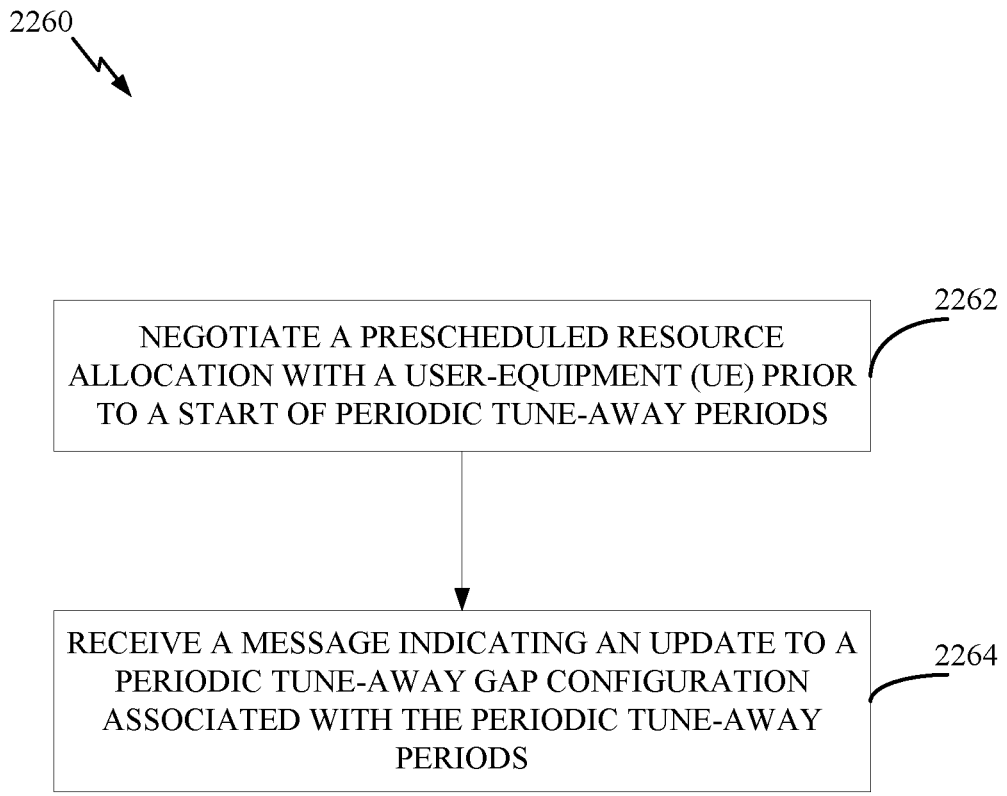
FIG. 22B is a flow diagram illustrating example operations for wireless communication, in accordance with certain aspects of the present disclosure.

FIG. 22B is a flow diagram illustrating example operations 2260 for wireless communication, in accordance with certain aspects of the present disclosure. The operations 2260 may be performed by a network entity.

The operations 2260 begin, at block 2262, by negotiating a prescheduled resource allocation with a user-equipment (UE) prior to a start of periodic tune-away periods, and at block 2264, receiving a message indicating an update to a periodic tune-away gap configuration associated with the periodic tune-away periods.

Figure 22C:
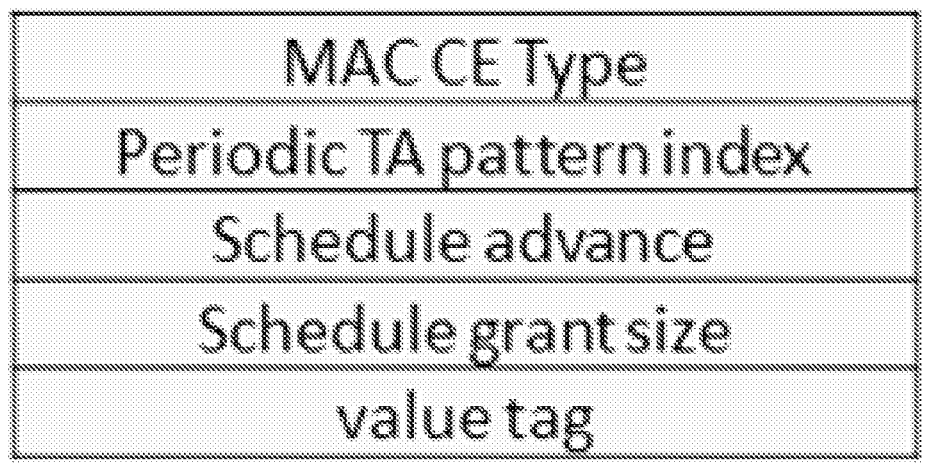
FIG. 22C illustrates a control element for channel pre-scheduling, accordance with certain aspects of the present disclosure.

FIG. 22C illustrates an MCE 2200 for PUSCH prescheduling, in accordance with certain aspects of the present disclosure. As illustrated, the MCE 2200 may include an MCE type indication, periodic TA pattern index (e.g., indicate the periodic tune-away pattern index for the PUSCH prescheduling), a schedule advance (e.g., the preferred schedule advance in milliseconds (ins) or 1/N milliseconds before the start time of the periodical gap, N being an integer greater than 1), the schedule grant size (e.g., the preferred UL grant size in bytes), and a value tag, as illustrated.

Figure 23:
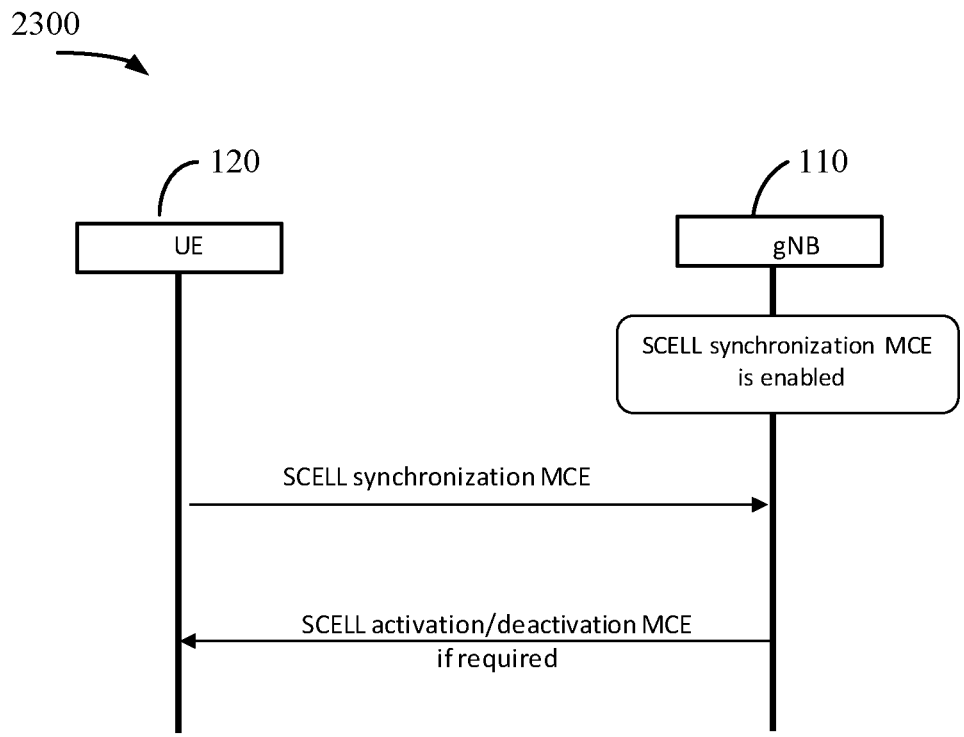
FIG. 23 is a call flow diagram illustrating example operations for secondary cell (SCELL) synchronization, in accordance with certain aspects of the present disclosure.

FIG. 23 is a call flow diagram illustrating example operations 2300 for secondary cell (SCELL) synchronization, in accordance with certain aspects of the present disclosure. As illustrated, an MCE may be transmitted by a UE to synchronize the SCELL state when the UE detects that a certain SCELL state mismatch occurs. For example, there may be a mismatch with the network with regards to the number of active carriers used for communication at the UE. For instance, prior to a tune-away period, a UE may be configured with multiple carriers, however, during the tune-away period, the network may have adjusted the number of active carriers such that the UE is assigned a single carrier for communication. Thus, the UE may continue to monitor multiple carriers (primary carrier of a primary cell (PCELL) and one or more secondary carriers of one or more SCELLs) after the tune-away period, when only a single carrier (primary carrier) is registered for the UE by the network. In this case, the UE may send an acknowledgment for multiple carriers, based on which the network may determine that the number of carriers configured at the UE is mismatched with the network, and indicate this mismatch to the UE.

The network entity may send an activation/deactivation MCE to the UE if the network finds that a certain SCELL state is out of sync with the UE, as described herein. The UE may then follow the activation/deactivation MCE with the synchronized SCELL state. The MCE for the SCELL synchronization may include an MCE type indication and SCELL state indication where a '0' (e.g., logic low state of a bit) indicates that the SCELL with SCell index i is in deactivated state and where a '1' (e.g., logic high state of a bit) indicates that the SCELL is activated.

Figure 24:
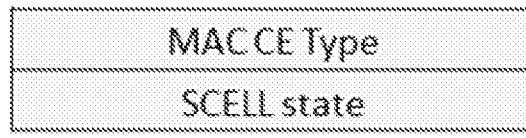
FIG. 24 illustrates a control element for SCELL synchronization, in accordance with certain aspects of the present disclosure.

FIG. 24 illustrates an MCE 2400 for SCELL synchronization, in accordance with certain aspects of the present disclosure. As illustrated, the MCE 2400 includes an MCE type indication and an indication of the SCELL state, as described herein.

Figure 25:
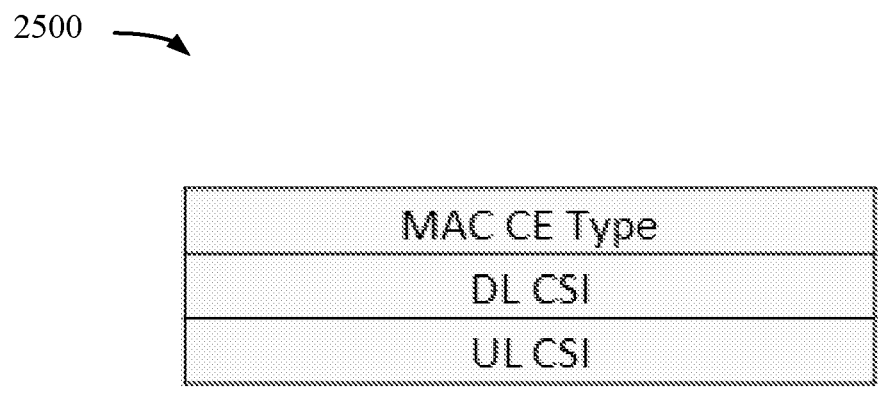

FIG. 25 illustrates an MCE 2500 for DL/UL link efficiency recovery, in accordance with certain aspects of the present disclosure. For example, when a UE detects that DL/UL link efficiency recovery on any carrier is required, the UE may send a DL/UL link efficiency recovery MCE to the network including an indication of the expected DL CSI rank, channel quality indicator (CQI)) or UL CSI pathloss, power headroom (PHR)) on a per carrier basis. The network is then able to reset the DL/UL rate control loop bias on a per carrier basis. The MCE for link efficiency recovery may include an MCE type indication, DL CSI (e.g., indicating the DL carrier RI and CQI per carrier), and UL CSI (e.g., indicating the UL pathloss and PHR per carrier), as described herein.

Figure 26:
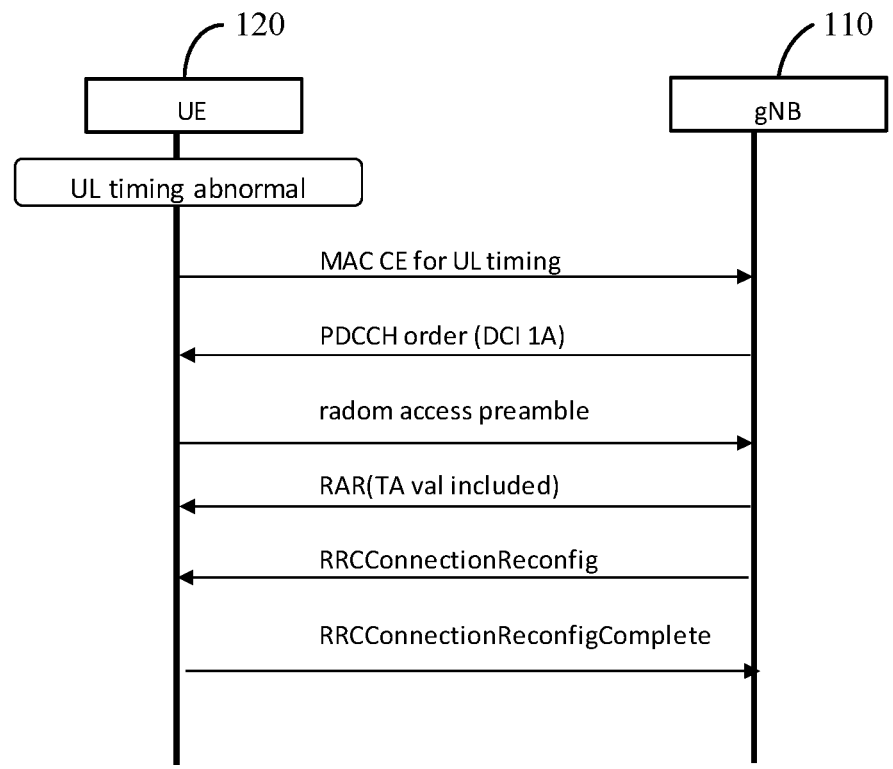
FIG. 26 is a call flow diagram illustrating example operations for timing synchronization, in accordance with certain aspects of the present disclosure.

FIG. 26 is a call flow diagram illustrating example operations 2600 for UL timing synchronization, in accordance with certain aspects of the present disclosure. As illustrated, when a UE detects abnormal UL timing information from a specific timing advance group (TAG), the UE transmits an UL timing synchronization MCE to the network entity. The network entity then triggers an UL synchronization procedure. For example, the network may send DCI with a physical downlink control channel (PDCCH) order to the UE. PDCCH Order is a mechanism by which the network entity may force the UE to initiate a random access channel (RACH) procedure. The UE then initiates the RACH procedure by transmitting a random access preamble. The network sends timing advance (TA) command in a random access response (RAR) message of the RACH procedure, allowing the UE to adjust the timing advance for communication according to the TA value. The network may also transmit an RRC connection reconfiguration message, which may be followed by the UE transmitting an RRC connection reconfiguration complete message, as illustrated.

Figure 27:
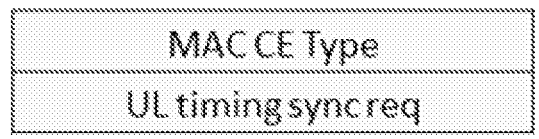
FIG. 27 illustrates a control element for tin synchronization, in accordance with certain aspects of the present disclosure.

FIG. 27 illustrates an MCE 2700 for UL timing synchronization, in accordance with certain aspects of the present disclosure. The MCE 2700 for UL timing synchronization may include an MCE type indication and UL timing synchronization indication where '1' indicates that synchronization on TAG i is needed). Certain aspects are generally directed to a BWP synchronization MCE to implement a signaling agreement regarding a BWP to be used for transmission if there is a BWP mismatch detected. The signaling agreement allows for the UE to indicate a preferred BWP. BWP synchronization as described herein allows for a more efficient synchronization of BWP when the mismatch is detected between the UE and the network. For example, the UE may inform the network of the preferred BWP based on channel conditions, which may more effective from UE's perspective.

Figure 28A:
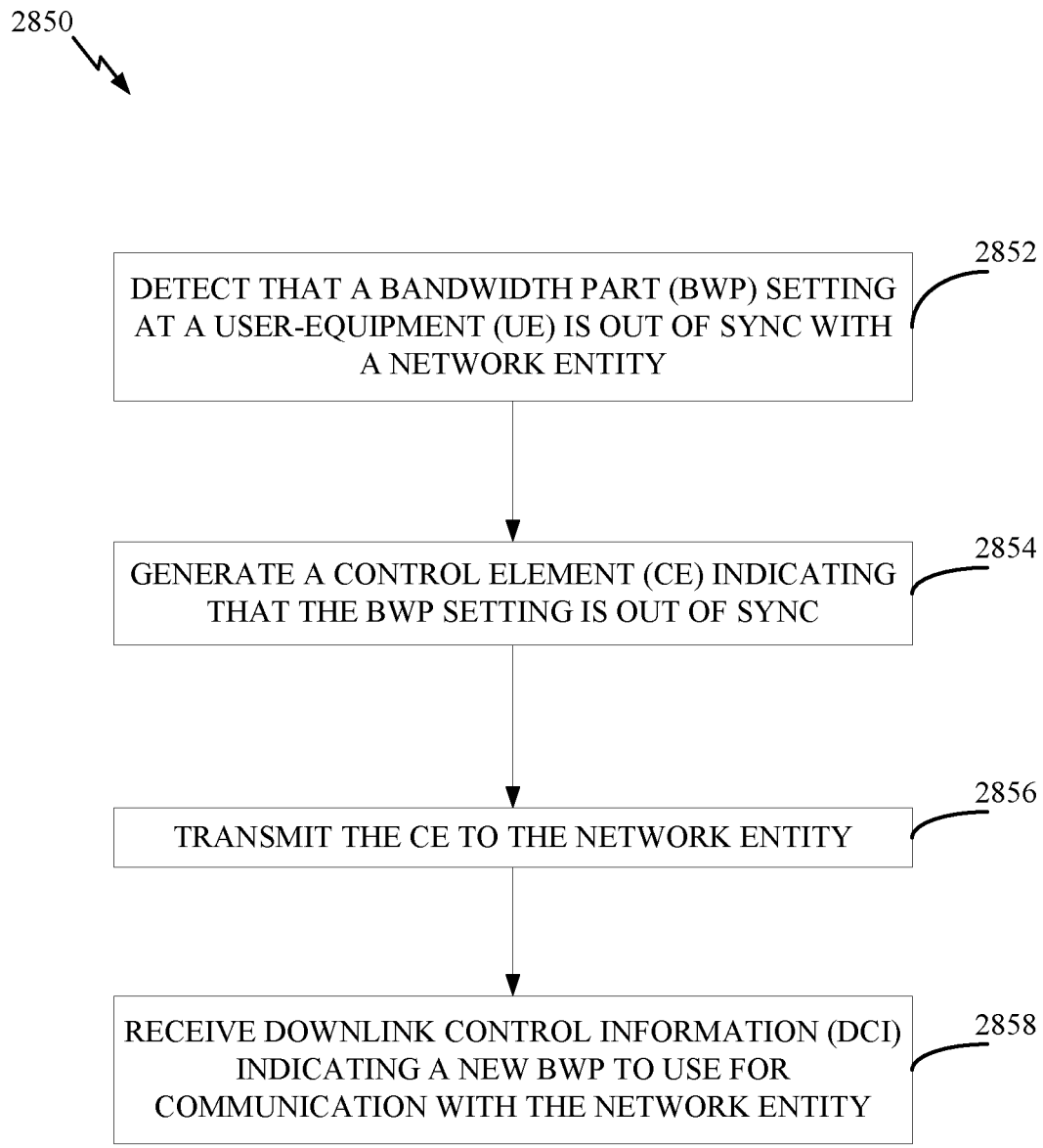
FIG. 28A is a flow diagram illustrating example operations for wireless communication, in accordance with certain aspects of the present disclosure.

FIG. 28A is a flow diagram illustrating example operations 2850 for wireless communication, in accordance with certain aspects of the present disclosure. The operations 2850 may be performed by a UE (e.g., UE 120).

The operations 2850 begin, at block 2852, by detecting that a bandwidth part (BWP) setting at a user-equipment (UE) is out of sync with a network entity, at block 2854, generating a control element (CE) indicating that the BWP setting is out of sync, the CE indicating a preferred BWP of the UE, at block 2856, transmitting the CE to the network entity, and at block 2858, receiving downlink control information (DCI) indicating a new BWP to use for communication with the network entity.

Figure 28B:
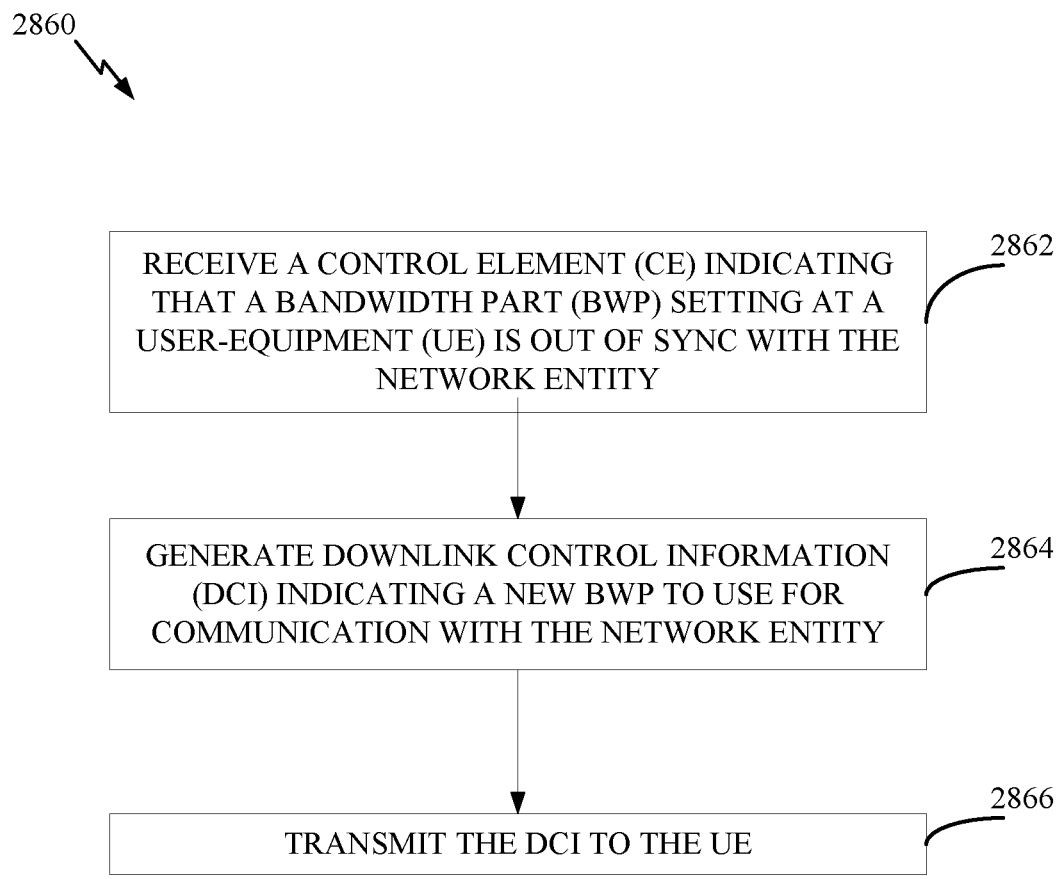
FIG. 28B is a flow diagram illustrating example operations for wireless communication, in accordance with certain aspects of the present disclosure.

FIG. 28B is a flow diagram illustrating example operations 2860 for wireless communication, in accordance with certain aspects of the present disclosure. The operations 2860 may be performed by a network entity.

The operations 2860 begin, at block 2862, by receiving a control element (CE) indicating that a bandwidth part (BWP) setting at a user-equipment (UE) is out of sync with the network entity, the CE indicating a preferred BWP of the UE, at block 2864, generating downlink control information (DCI) indicating a new BWP to use for communication with the network ty based on the CE, and at block 2866, transmitting the DCI to the UE.

Figure 28C:
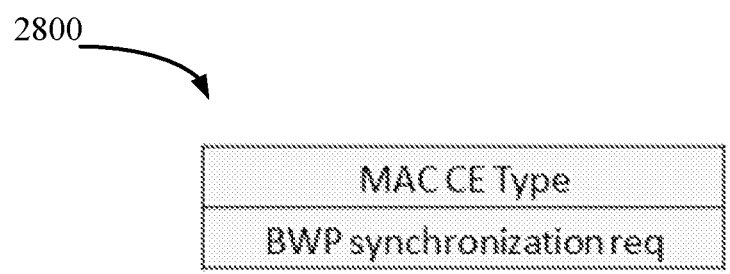
FIG. 28C illustrates a control element for bandwidth part (BWP) synchronization, in accordance with certain aspects of the present disclosure.

FIG. 28C illustrates an MCE 2800 for bandwidth part (BWP) synchronization, in accordance with certain aspects of the present disclosure. When a UE detects that a BWP is out-of-sync with the network, the UE may send a BWP synchronization MCE 2800 on a default BWP with a preferred BWP index set. The BWP used for communication may be out of sync with the network after a tune-away period during which the network may have reconfigured the BWP for the UE. The network triggers a BWP switch by scheduling a DCI, the DCI indicating a BWP to be used by the UE. The UE then follows the BWP indicated in the DCI for communication. The MCE 2800 for the BWP synchronization may include an MCE type indication, and BWP sync required indication, as illustrated.

Figure 29A:
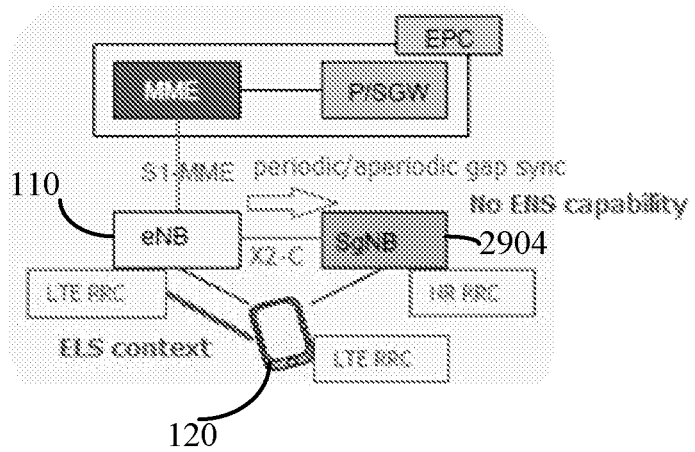
FIGS. 29A and 29B illustrate wireless communication systems for coexistence with extended LTE signaling (ELS) in a non-standalone (NSA) deployment, in accordance with certain aspects of the present disclosure.
Figure 29B:
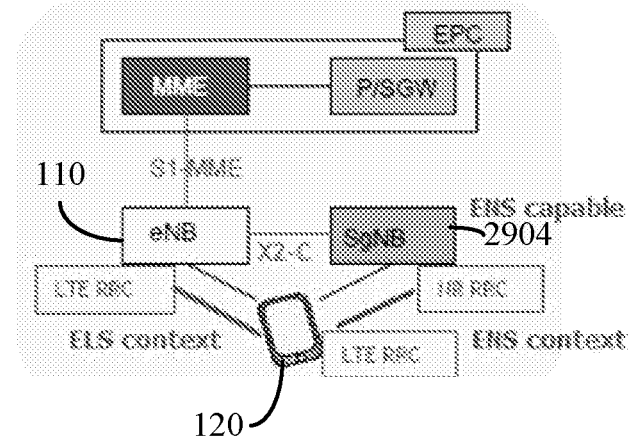

FIGS. 29A and 29B illustrate wireless communication systems 2900, 2902 for coexistence with extended LTE signaling (ELS) in a non-standalone (NSA) deployment, in accordance with certain aspects of the present disclosure. NSA deployment allows for 5G networks to be supported by existing 4G infrastructure. For NSA with and an ELS capable eNB configured as an MeNB and a none enhanced network selection (ENS) capable gNB configured as an SgNB 2904 as illustrated in FIG. 27, an NSA UE may establish an ELS context (e.g., periodic/aperiodic gap information as described herein) with the ELS capable MeNB. The MeNB then informs the SgNB 2904 of the periodic/aperiodic gap information to synchronize the scheduling on both the MeNB and SgNB 2904. For NSA with LTE ELS capable eNB configured as MeNB and an ENS capable gNB configured as SgNB 2904 as illustrated in FIG. 28C, the UE establishes ELS context with the ELS capable MeNB (e.g., via. RRC) and establishes the ENS context with ENS capable SgNB (e.g., via RRC). In other words, the UE registers LTE MSIM events and NR MSIM events on the MeNB and SgNB 2904 independently (e.g., via L2 layer signaling).

Figure 30:
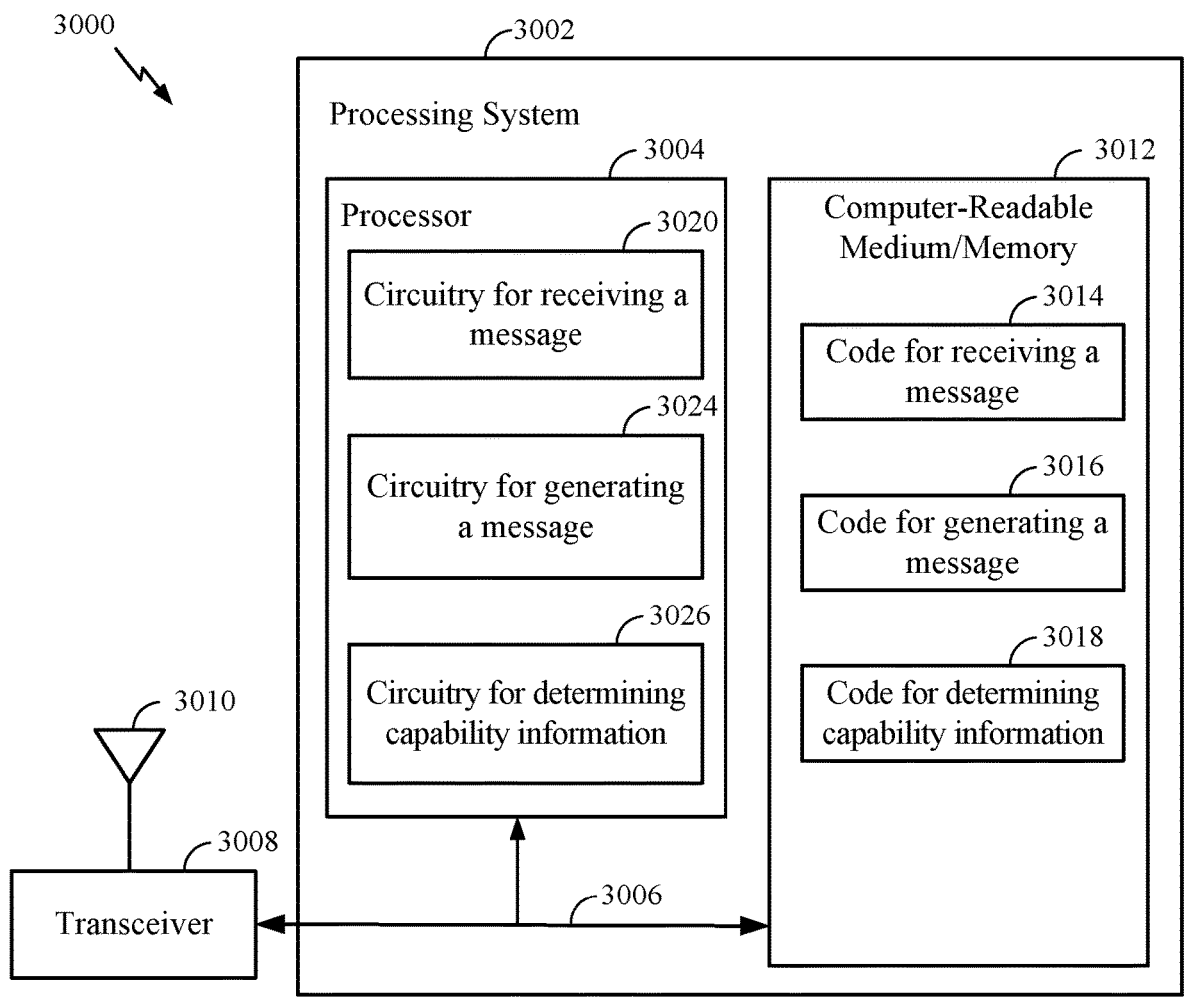
FIG. 30 illustrates a communications device that may include various components configured to perform operations for the techniques disclosed herein in accordance with aspects of the present disclosure.

FIG. 30 illustrates a communications device 3000 that may include various components (e.g., corresponding to means-plus-function components) configured to perform operations for the techniques disclosed herein. The communications device 3000 includes a processing system 3002 coupled to a transceiver 3008. The transceiver 3008 is configured to transmit and receive signals for the communications device 3000 via an antenna 3010, such as the various signals as described herein. The processing system 3002 may be configured to perform processing functions for the communications device 3000, including processing signals received and/or to be transmitted by the communications device 3000.

The processing system 3002 includes a processor 3004 coupled to a computer-readable medium/memory 3012 via a bus 3006. In certain aspects, the computer-readable medium/memory 3012 is configured to store instructions computer-executable code) that when executed by the processor 3004, cause the processor 3004 to perform the operations described herein, or other operations for performing the various techniques discussed herein In certain aspects, computer-readable medium/memory 3012 stores code 3014 for receiving a message (e.g., one of various MCEs described herein, or message enquiring about UE capability), code 3016 for generating (e.g., for transmission via bus 3006) a message (e.g., one of various MCEs described herein, or message enquiring about UE capability), and code 3018 for determining capability information. In certain aspects, the processor 3004 has circuitry configured to implement the code stored in the computer-readable medium/memory 3012. The processor 3004 includes circuitry 3020 for receiving a message (e.g., MCE), code 3024 for generating a message (e.g., MCE), and code 3026 for determining capability information.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, h, c, a-b, a-c, b-c, and a-b-c, as well as any combination with multiples of the same element (e.g., a-a-a, a-a-a, a-a-h, a-a-c a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving receiving information accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended, to be dedicated to the public regardless of whether such disclosure is explicitly recited in the claims. No claim element is to be construed under the provisions of 35 § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices, By way of example, a software module may be loaded into RAM from a hard drive when a triggering event occurs, During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
    receiving a first message from a network entity enquiring regarding information associated with a multi-subscriber identify module (SIM) capability of the UE;
    determining the information associated with the multi-SIM capability of the UE in response to the enquiry from the network entity; and
    communicating one or more messages to indicate the information regarding the multi-SIM capability to the network entity, wherein the communicating the one or more messages comprises:
        generating a second message indicating a preferred discontinuous reception (DRX) cycle of the UE for reception via a radio-access technology (RAT) associated with a SIM of the UE;
        transmitting the second message to the network entity; and receiving a third message indicating another DRX cycle to be applied for reception via the RAT after transmitting the second message.

2. The method of claim 1, further comprising receiving a system information block (SIB) indicating that the network entity supports a signaling protocol for communicating the information, the one or more messages being communicated in response to the indication that the network entity supports the signaling protocol.

3. The method of claim 1, further comprising generating a message indicating that the UE supports a signaling protocol for communicating the information, and transmitting the message to the network entity.

4. The method of claim 1, wherein the other DRX cycle is different than the preferred DRX cycle, the third message indicating the other DRX cycle via an offset value with reference to the preferred DRX cycle.

5. The method of claim 1, wherein the preferred DRX cycle comprises a preferred connected mode DRX (CDRX) cycle, the second message being transmitted while the UE is in connected mode.

6. The method of claim 5, wherein the third message comprises a radio resource control (RRC) reconfiguration message having the other DRX cycle to be applied.

7. The method of claim 1, wherein communicating the one or more messages comprises:
transmitting a radio resource control (RRC) request to the network entity, the RRC request comprising an indication of whether the RRC request is requesting an RRC release or an RRC suspension of the UE; and
receiving an RRC message from the network entity confirming the RRC request.

8. A method for wireless communication by a user-equipment (UE), comprising:
generating at least one control element (CE) having information indicating at least one tune-away period of a radio-access technology (RAT) associated with a multi-subscriber identify module (SIM) capability of the UE;
transmitting the at least one CE indicating the at least one tune-away period to a network entity;
detecting that a bandwidth part (BWP) setting at the UE is out of sync with the network entity;
generating a second CE indicating that the BWP setting is out of sync;
transmitting the second CE to the network entity; and
receiving downlink control information (DCI) indicating a new BWP to use for communication with the network entity.

9. The method of claim 8, wherein the indication of the at least one tune-away period comprises an indication of a periodic tune-away gap configuration for the RAT.

10. The method of claim 9, wherein the indication of the at least one tune-away period further comprises an indication of a communication capability of the UE during periodic tune-away periods associated with the periodic tune-away gap configuration.

11. The method of claim 10, wherein the indication of the communication capability comprises indicating whether the communication capability is limited during the periodic tune-away periods or that communication is unavailable during the periodic tune-away periods.

12. The method of claim 9, wherein:
the indication of the at least one tune-away period comprises an indication of a duration of periodic tune-away periods associated with the periodic tune-away gap configuration; and
the method further comprises generating another CE indicating that at least one of the periodic tune-away periods has ended if an actual duration of the at least one of the periodic tune-away periods is longer than the indicated duration of the periodic tune-away periods, and transmitting the other CE to the network entity.

13. The method of claim 9, further comprising receiving another CE acknowledging reception of the at least one CE by the network entity.

14. The method of claim 9, further comprising generating another CE indicating a cancellation of the periodic tune-away gap configuration, and transmitting the other CE to the network entity.

15. The method of claim 9, further comprising negotiating a prescheduled resource allocation with the network entity prior to a start of the periodic tune-away periods.

16. The method of claim 15, further comprising generating a message indicating an update to the periodic tune-away gap configuration and transmitting the message via the prescheduled resource allocation.

17. The method of claim 8, wherein the information indicating the at least one tune-away period comprises an indication of an aperiodic tune-away period.

18. The method of claim 17, wherein the information further indicates a maximum tune-away gap duration associate with the aperiodic tune-away period.

19. The method of claim 18, further comprising receiving an RRC release message if an actual duration of the aperiodic tune-away period is longer than the maximum tune-away gap duration.

20. The method of claim 17, further comprising generating another CE indicating that the aperiodic tune-away period has ended and transmitting the other CE to the network entity after the aperiodic tune-away period.

21. The method of claim 8, further comprising:
generating a CE having an indication of a current state of a secondary cell (SCELL) stored at the UE;
transmitting the CE to the network entity; and
receiving another CE indicating an updated state of the SCELL if the current state stored at the UE is out of sync with the network entity.

22. The method of claim 21, wherein the other CE comprises one or more bits indicating whether the SCELL is to be activated or deactivated if the current state stored at the UE is out of sync with the network entity.

23. The method of claim 8, further comprising:
generating another CE indicating at least one of uplink (UL) or downlink (DL) channel state information (CSI) for each active carrier at the UE; and
transmitting the other CE to the network entity.

24. The method of claim 8, further comprising:
generating a CE requesting timing synchronization for uplink communication;
transmitting the CE to the network entity; and
receiving another CE triggering a timing synchronization procedure for the uplink communication after transmitting the CE.

25. The method of claim 24, wherein the timing synchronization procedure comprises a random-access channel (RACH) procedure, the method further comprising adjusting a timing advance (TA) parameter for the uplink communication based on a message received in accordance with the RACH procedure.

26. The method of claim 8, wherein:
the network entity comprises master node, the method further comprising determining whether a secondary node is enhanced network selection (ENS) capable; and the at least one CE comprises:
- a CE indicating the at least one tune-away period to the master node; and
- another CE indicating the at least one tune-away period to the secondary node if the secondary node is ENS capable.

27. A method for wireless communication, comprising:
- detecting that a bandwidth part (BWP) setting at a user-equipment (UE) is out of sync with a network entity;
- generating a control element (CE) indicating that the BWP setting is out of sync, the CE indicating a preferred BWP setting;
- transmitting the CE to the network entity; and
- receiving downlink control information (DCI) indicating a new BWP to use for communication with the network entity.

* * * * *